US011823541B2

(12) United States Patent
Luongo et al.

(10) Patent No.: US 11,823,541 B2
(45) Date of Patent: Nov. 21, 2023

(54) MANAGING ACCESS TO A RESTRICTED SITE WITH A BARRIER AND/OR BARRIERLESS AND DETECTING ENTRY

(71) Applicant: SightPas LLC, Palm Beach Gardens, FL (US)

(72) Inventors: John Luongo, Oceanside, NY (US); Colleen K. Hendry, Woonsocket, RI (US); Marcel Majernik, Kosice (SK); Dusan Beblavy, Bidovce (SK); Jan Hricko, Presov (SK)

(73) Assignee: SIGHTPAS LLC, Palm Beach Gardens, FL (US)

( * ) Notice: Subject to any disclaimer, the term of this patent is extended or adjusted under 35 U.S.C. 154(b) by 170 days.

(21) Appl. No.: 17/609,743

(22) PCT Filed: Apr. 15, 2020

(86) PCT No.: PCT/US2020/028306
§ 371 (c)(1),
(2) Date: Nov. 8, 2021

(87) PCT Pub. No.: WO2020/226863
PCT Pub. Date: Nov. 12, 2020

(65) Prior Publication Data
US 2022/0215729 A1 Jul. 7, 2022

Related U.S. Application Data

(60) Provisional application No. 62/844,336, filed on May 7, 2019.

(51) Int. Cl.
*G08B 13/196* (2006.01)
(52) U.S. Cl.
CPC . *G08B 13/19695* (2013.01); *G08B 13/19656* (2013.01)

(58) Field of Classification Search
CPC ........ G08B 13/19695; G08B 13/19656; G07C 9/27; G07C 9/257; G07C 9/28;
(Continued)

(56) References Cited

U.S. PATENT DOCUMENTS 7,455,224 B2  11/2008  Kochevar et al.
7,466,223 B2  12/2008  Sefton
(Continued)

FOREIGN PATENT DOCUMENTS

WO    2013074301 A1    5/2013

OTHER PUBLICATIONS

International Search Report and Written Opinion of the International Searching Authority dated Jul. 15, 2020, corresponding to International Application No. PCT/US20/28306; 8 total pages.

*Primary Examiner* — Omeed Alizada
(74) *Attorney, Agent, or Firm* — Carter, DeLuca and Farrell LLP

(57) ABSTRACT

An exemplary central system is configured to receive and store data from a registered device passing through an entryway of a restricted site, in a manner that permits the detection of unauthorized entry into the restricted site. A beacon broadcasts a beacon signal which prompts the registered device to transmit an active device ID and an active location ID to the central system, a sensor detects movement approaching the entryway and notifies the central system, and a camera captures an image of a region encompassing the entryway. The central system is configured to, among other things, receive the notification, communicate a control signal to the camera to capture the image, receive and store the image from the camera, cross-reference the active location ID with a registered location ID, and cross-reference the active device ID with registered device IDs. The entryway may have a barrier or may be barrierless.

15 Claims, 20 Drawing Sheets

(58) Field of Classification Search
CPC ...... G07B 15/02; H04W 12/06; H04W 12/08; H04W 12/61; H04W 12/63; H04W 12/65; H04W 12/71
See application file for complete search history.

(56) References Cited

U.S. PATENT DOCUMENTS

| | | |
|---|---|---|
| 7,475,812 B1 | 1/2009 | Novozhenets et al. |
| 9,591,570 B2 | 3/2017 | Kubo et al. |
| 9,674,684 B1 | 6/2017 | Mendelson |
| 9,805,533 B2 | 10/2017 | Shin et al. |
| 10,169,774 B2 | 1/2019 | Kerr et al. |
| 10,198,886 B2 | 2/2019 | Kusens et al. |
| 2003/0023874 A1 | 1/2003 | Prokupets et al. |
| 2004/0219903 A1 | 11/2004 | Despain et al. |
| 2007/0290797 A1 | 12/2007 | Harkins et al. |
| 2010/0176919 A1 | 7/2010 | Myers et al. |
| 2012/0025947 A1 | 2/2012 | Sinha |
| 2012/0096265 A1 | 4/2012 | Fisher et al. |
| 2013/0027180 A1 | 1/2013 | Lakamraju et al. |
| 2014/0015978 A1 | 1/2014 | Smith |
| 2015/0339871 A1 | 11/2015 | Wagner et al. |
| 2017/0055157 A1* | 2/2017 | Bergdale ................ G07B 15/04 |
| 2017/0186253 A1 | 6/2017 | Schlechter et al. |
| 2017/0331827 A1 | 11/2017 | Salyers et al. |
| 2018/0158106 A1 | 6/2018 | Warwas |
| 2018/0374180 A1 | 12/2018 | Sprogis et al. |

* cited by examiner

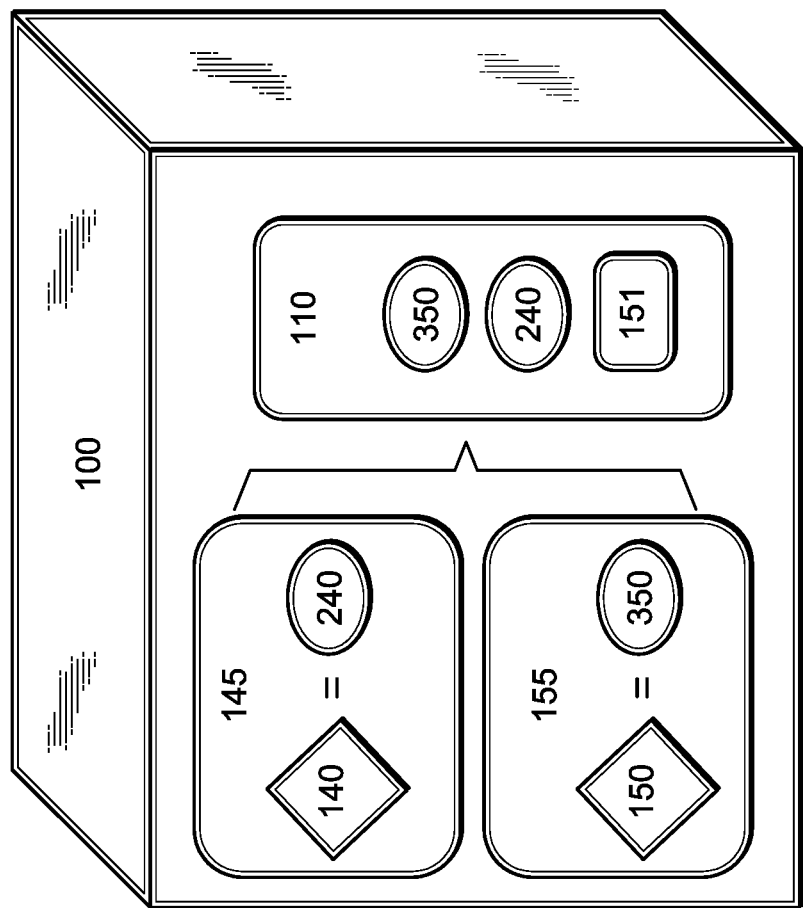
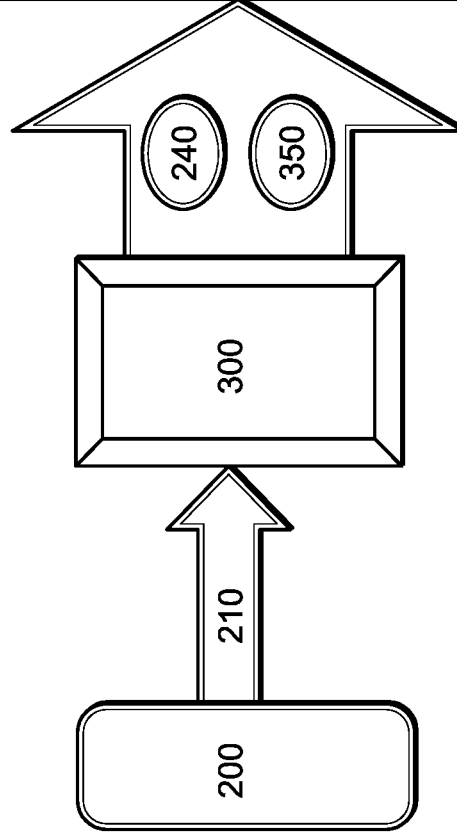
FIG. 2B

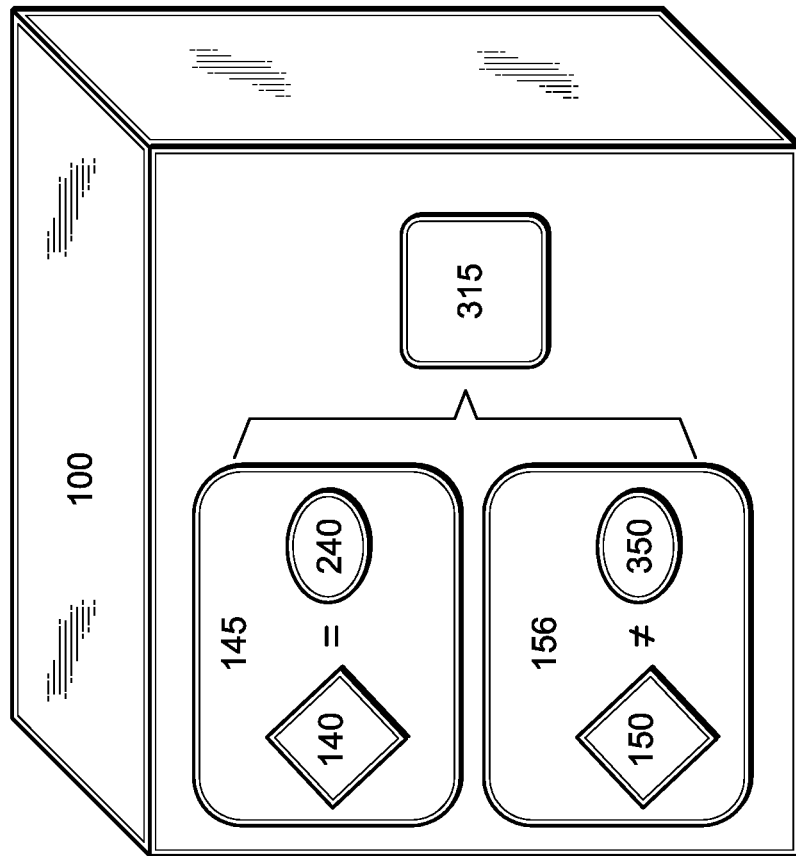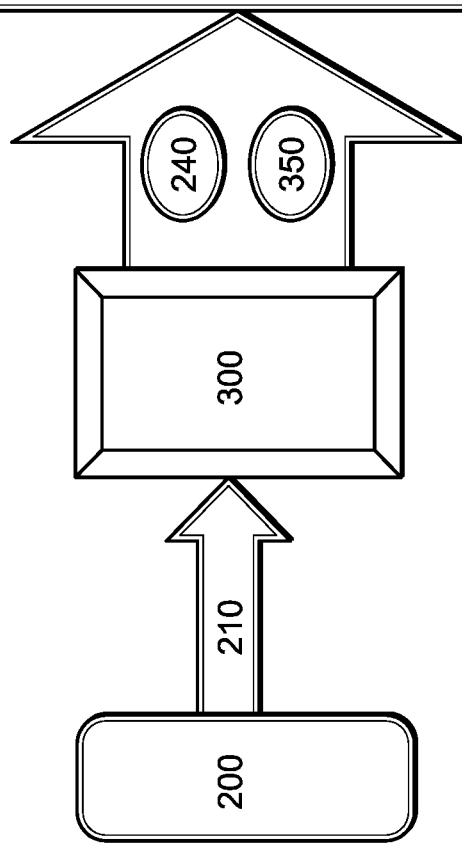
FIG. 2C

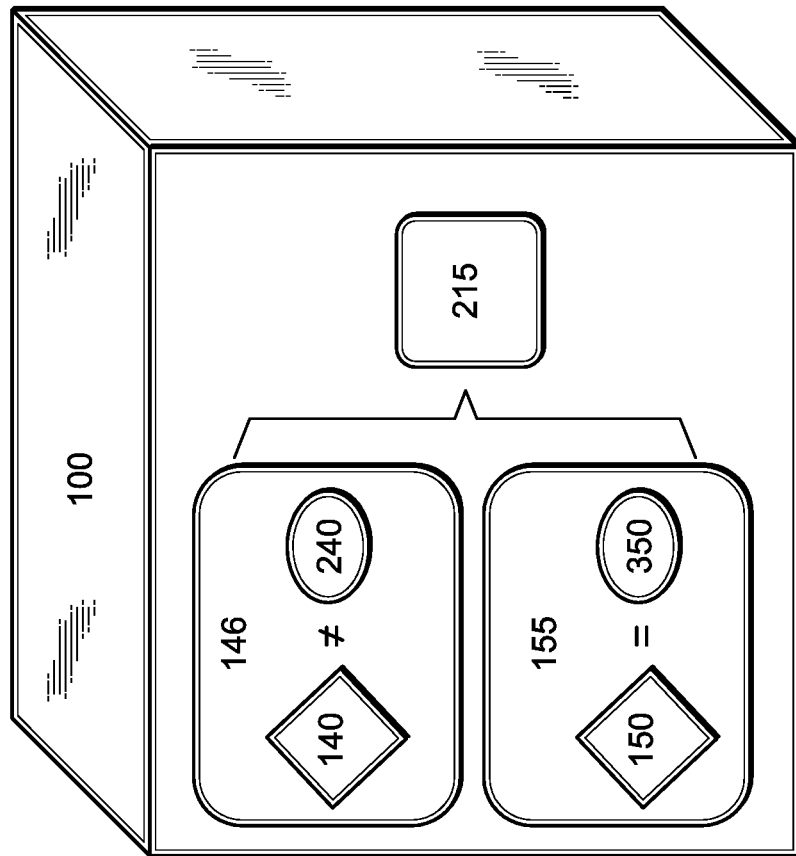
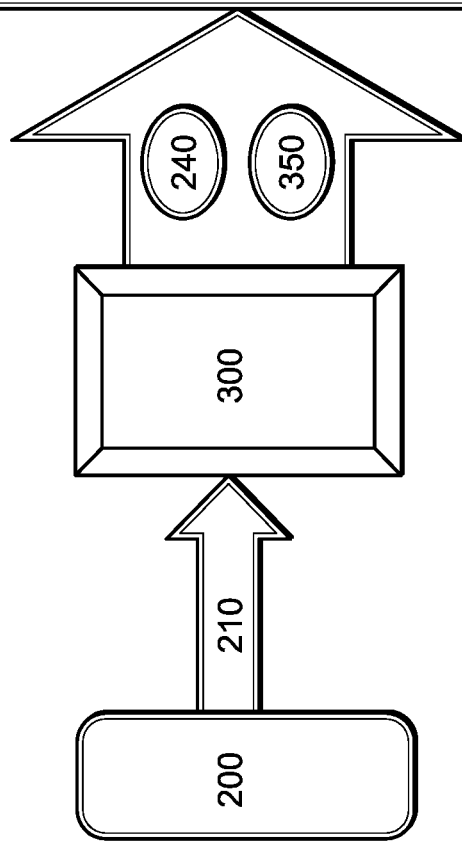
FIG. 2D

FIG. 5A

Reports

Reports

| Report Type | | Site | |
|---|---|---|---|
| Contractors | ▽ | Accra Site | ▽ |
| Start Date | | End Date | |
| 12/01/2018 | ▽ | 12/31/2018 | ▽ |

[Download CSV]   [Logo]

Contractors on Site - Report

| Site Name | Site Supervisor | | Report Period | Generated |
|---|---|---|---|---|
| Accra Site | Ivan Pear | | 12/01/2018 - 12/31/2018 | 11/02/18 |

| ID | Contractor | Last Name | First Name | Valid From | Valid to | Time In | Time Out | Total Time On Site |
|---|---|---|---|---|---|---|---|---|
| 10032 | ABC Plumbing | Longoria | Angela | 11/02/18 | 01/15/19 | 08:02 AM | 09:29 AM | 6h 25 min |
| 10032 | ABC Plumbing | Longoria | Angela | 11/02/18 | 01/15/19 | 08:02 AM | 09:29 AM | 6h 25 min |
| 10103 | GNN Electric | Nititham | Prinya | 11/02/18 | 01/15/19 | 08:02 AM<br>09:48 AM<br>01:10 PM | 09:29 AM<br>12:21 PM<br>04:29 PM | 6h 25 min |
| 10103 | GNN Electric | Nititham | Prinya | 11/02/18 | 01/15/19 | 08:02 AM<br>09:48 AM<br>01:10 PM | 09:29 AM<br>12:21 PM<br>04:29 PM | 6h 25 min |
| 10103 | GNN Electric | Nititham | Prinya | 11/02/18 | 01/15/19 | 08:02 AM<br>09:48 AM<br>01:10 PM | 09:29 AM<br>12:21 PM<br>04:29 PM | 6h 25 min |

- Companies
- Sites
- Site Supervisors
- Contractors
- Reports
- Messages
- Admins

[Log Out]

Reports

Reports

Report Type: Contractors - Status  
Site: Accra Site  
Start Date: 12/01/2018  
End Date: 12/31/2018

[Download CSV] [Load]

Contractors on Site - Status Report

| Site Name | Site Supervisor | Report Period | Generated | Access Permitted Contractors | Access Denied Contractors | Manual Check-ins |
|---|---|---|---|---|---|---|
| Accra Site | Ivan Pear | 12/01/2018 - 12/31/2018 | 11/02/18 | 2,125 | 213 | 184 |

| ID | Contractor | Last Name | First Name | Timestamp | Access |
|---|---|---|---|---|---|
| 10032 | ABC Plumbing | Longoria | Angela | 08:02 AM | Access Allowed |
| 10036 | ABC Electric | Ivanovic | Adam | 08:12 AM | Access Allowed |
| 10036 | GNN Plumbing | Forman | Eric | 08:24 AM | Access Denied |
| 10225 | | Starman | Gabriel | 09:02 AM | Manual Check-in |

- Companies
- Sites
- Site Supervisors
- Contractors
- Reports
- Messages
- Admins

[Log Out]

FIG. 5B

Reports

Reports

Report Type: Site Statistics
Site: Accra Site
Start Date: 12/01/2018
End Date: 12/31/2018

[Download CSV]

Site Statistics

| Site Name | Site Supervisor | Reported Day | Generated | All on Site Contractors | All Contractors | All on Site Contractors | Total Combined Hours |
|---|---|---|---|---|---|---|---|
| Accra Site | Ivan Pear | 12/01/2018 | 11/02/18 | 127 | 2 255 | 1 075 | 25 187h 02min |

| ID | Company | Contractors | | | | | Company Onsite Hours |
|---|---|---|---|---|---|---|---|
| 10103 | GNN Electric | 165 | | | | | 1 116h 58min |
| 10103 | ABC Plumbing | 165 | | | | | 1 116h 58min |
| 10103 | GNN Electric | 165 | | | | | 1 116h 58min |
| 10103 | FFF Construction | 165 | | | | | 1 116h 58min |
| 10103 | DMG and Co. | 165 | | | | | 1 116h 58min |
| 10103 | BMC Transport | 165 | | | | | 1 116h 58min |
| 10103 | R-Type Co. | 165 | | | | | 1 116h 58min |
| 10103 | UPS | | | | | | |

- Companies
- Sites
- Site Supervisors
- Contractors
- Reports
- Messages
- Admins

[Log Out]

Sites / Site Detail

Site | National Stadium

Site info  Entrances  Site Supervisors

- West Entrance
- East Entrance
- Main Gate
- Suppliers entrance
- Hard vehicles entrance
- South Entrance
- North Entrance

Entrance

Name: Sunnyvale South

Beacons

- Inner Beacon
  Beacon ID: 123Z-XY19
- Outer Beacon
  Beacon ID: 123Z-XY20

[+ New Entrance]   [Deactivate Entrance]   [Save]

- Companies
- Sites
- Site Supervisors
- Contractors
- Reports
- Messages
- Admins

[Log Out]

FIG. 6B

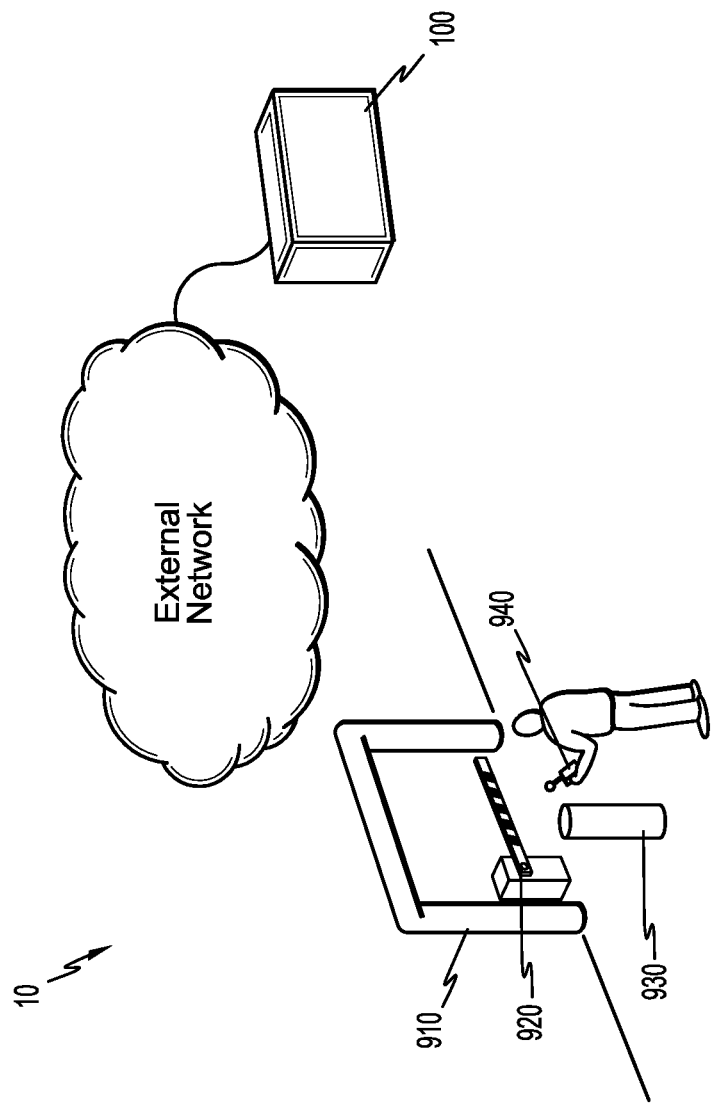

FIG. 7B

MANAGING ACCESS TO A RESTRICTED SITE WITH A BARRIER AND/OR BARRIERLESS AND DETECTING ENTRY

CROSS-REFERENCE TO RELATED APPLICATIONS

The present application claims the benefit of and priority to U.S. Provisional Application No. 62/844,336, filed on May 7, 2019, which is hereby incorporated by reference herein in its entirety.

BACKGROUND

Technical Field

The present disclosure relates generally to providing site security and, more particularly, to managing access to a restricted site through an entryway.

Related Art

Access management systems are used to efficiently allow authorized persons or objects to enter into a restricted zone while simultaneously ensuring that unauthorized persons or objects are not allowed entry, or to at least identify unauthorized persons or objects so that they can be processed retroactively.

By far the most common application of access management systems are toll roads. Such systems leverage radio frequency technologies to distinguish between authorized and unauthorized vehicles at controlled entry points, where authorized vehicles are allowed to proceed without having to come to a full stop to be manually processed. Authorized vehicles possess radio-frequency tags that can be detected as they approach the entry point. These tags are affiliated with a profile for the driver or the vehicle owner and can include a varied assortment of personal information. In practice, the tags may include a valid form of payment information such as a credit card account or a checking account. In this manner, upon detecting the tag, a back-end computerized system can automatically process payment for the driver/owner and allow the vehicle to pass through unhindered. Furthermore, in situations when manual processing is not an option, these entry points instead rely on captured images of the unauthorized vehicle license plate to identify the driver/owner and retroactively send a bill in the mail.

Unlike such toll road systems, most other access management systems do not have very reliable methods of identifying unauthorized users and retroactively holding them accountable. Rather, many access management systems make use of a similar process involving a token or a key card that can be detected on approach using RF transceivers to automatically open a locked door, gate, etc. These less robust access management systems are commonly used to manage human access to buildings or other spaces unique to the human environment. However, none of them provide the efficiency of the barrierless entry points seen, e.g., in the access management systems on toll roads.

Accordingly, there is interest in improving access management systems to manage human access to buildings or other spaces unique to the human environment.

SUMMARY

The present disclosure relates to systems and methods for managing site access to a restricted site with a barrierless entryway, in a manner the permits the detection of unauthorized entry into the restricted site. The disclosed systems and methods remove need for carrying a separate token or keycard by making use of mobile electronic devices, like smartphones or smart watches, that are already very likely to carried by a user. The disclosed systems and methods also provide access management features for a restricted site with respect to persons who may not be authorized to enter the restricted site. Although entryways to restricted sites according to the present disclosure do not require a barrier, various sites may include certain entryways that include a barrier such as a turnstile or gate, etc. As will be explained later herein, such barriers or turnstiles can be unlocked or opened by a QR code on a smartphone, smartwatch, printout, or badge.

In accordance with aspects of the present disclosure, an access management system includes a central system configured to receive and store data from a registered device passing through a barrierless entryway of a restricted site; a beacon configured to broadcast a beacon signal over a zone that includes the barrierless entryway, wherein the beacon signal is configured to prompt the registered device receiving the beacon signal to transmit an active device ID for the registered device and an active location ID for the barrierless entryway to the central system; a sensor configured to detect movement towards the restricted site on an approach to the barrierless entryway and to communicate a notification to the central system indicating the detected movement; and a camera configured to capture an image of a region encompassing the approach to the barrierless entryway and to communicate the image to the central system. The central system is configured to store a registered location ID for the barrierless entryway and registered device IDs for a plurality of registered devices; receive the notification and, in response to the notification, communicate a control signal to the camera to capture the image; receive the image from the camera and store the image; store the active device ID and the active location ID; cross-reference the active location ID with the registered location ID; and cross-reference the active device ID with the registered device IDs.

In embodiments, upon finding a first match between the active device ID and the registered device IDs and finding a second match between the active location ID and the registered location ID, the central system is configured to create and store one of: an authentication record including: the active device ID, the active location ID, and a device timestamp and/or date stamp, or an unauthorized entry record including: an active location ID and a device time and/or date stamp.

In embodiments, the central system is configured to create and store a visual record including: the image and an image timestamp and/or date stamp.

In embodiments, the central system is configured to populate an event log with an event entry when a separation in time between the image time/date stamp and a closest earlier device time/date stamp is below a threshold value, such that the event entry includes the active location ID, the active device ID, the image, and the image time/date stamp.

In embodiments, the central system is further configured to populate the event log with a risk entry when a separation in time between the image timestamp and/or date stamp and a closest earlier device timestamp and/or date stamp is beyond the threshold value, such that the risk entry includes the visual record with no accompanying authentication record or unauthorized entry record, and the risk entry prompts the central system to communicate an audible and/or visible alert to the restricted site and/or to one or more other sites.

In embodiments, the access management system further includes a display screen at the restricted site configured to provide a display of the event log in real time as the event log is populated by the central system.

In embodiments, that access management system further includes a display screen at the restricted site configured to raise an audible and/or visible alarm in response to the alert received from the central system, and a speaker at the restricted site configured to raise an audible alarm in response to the alert received from the central system.

In embodiments, the central system is configured to generate a plurality of reports based on at least one of: the image, the active location ID, the image timestamp and/or date stamp from the camera, the active device ID, the active location ID, or the device timestamp and/or date stamp from the registered device.

In embodiments, the camera is installed in a position such that the image can be captured before a person triggering the sensor passes through the barrierless entryway.

In embodiments, the image includes a facial region of a person.

In embodiments, the sensor is an infrared sensor.

In accordance with aspects of the present disclosure, a method includes broadcasting, by a beacon, a beacon signal over a zone that includes a barrierless entryway of a restricted site, wherein the beacon signal is configured to prompt a registered device receiving the beacon signal to transmit an active device ID for the registered device and an active location ID for the barrierless entryway; receiving, at a central system, the active device ID and the active location ID from the registered device passing through the barrierless entryway of the restricted site; detecting, by a sensor, movement towards the restricted site on an approach to the barrierless entryway and notifying the central system of the detected movement; receiving, at the central system, the notification and, in response to the notification, communicating a control signal to a camera at the restricted site to capture an image; capturing, by the camera, the image of a region encompassing the approach to the barrierless entryway, and communicating the image to the central system; storing by the central system a registered location ID for the barrierless entryway and registered device IDs for a plurality of registered devices; receiving by the central system the image from the camera and storing the image; storing by the central system the active device ID and the active location ID; cross-referencing by the central system the active location ID with the registered location ID; and cross-referencing by the central system the active device ID with the registered device IDs.

In embodiments, the method includes creating and storing an authentication record or an unauthorized entry record, upon finding a first match between the active device ID and the registered device IDs, and finding a second match between the active location ID and the registered location ID, wherein the authentication record or unauthorized entry record includes: the active device ID, the active location ID, and a device timestamp and/or date stamp, and wherein the unauthorized entry record includes: the active location ID and a device time/date stamp.

In embodiments, the method includes creating and storing a visual record including: the image and an image timestamp and/or date stamp.

In embodiments, the method includes populating an event log with an event entry when a separation in time between the image time/date stamp and a closest earlier device time/date stamp is below a threshold value, wherein the event entry includes the active location ID, the active device ID, the image, and the image time/date stamp.

In embodiments, the method includes populating the event log with a risk entry when a separation in time between the image time/date stamp and a closest earlier device time/date stamp is beyond the threshold value, wherein the risk entry includes the visual record with no accompanying authentication record or unauthorized entry record, and the risk entry prompts the central system to communicate an alert to the restricted site.

In embodiments, the method includes displaying at the restricted site a display of the event log in real time as the event log is populated by the central system.

In embodiments, the method includes raising a visible alarm at the restricted site in response to the alert received from the central system, and raising an audible alarm at the restricted site in response to the alert received from the central system.

In embodiments, the method includes generating a plurality of reports based on at least one of: the image, the active location ID, the image timestamp and/or date stamp from the camera, the active device ID, the active location ID, or the device timestamp and/or date stamp from the registered device.

In embodiments, the camera is installed in a position such that the image can be captured before a person triggering the sensor passes through the barrierless entryway.

In embodiments, the image includes a facial region of a person.

BRIEF DESCRIPTION OF THE DRAWINGS

The accompanying drawings, which are incorporated in and constitute a part of the specification, illustrate exemplary embodiments of the disclosure and together with a general description of the disclosure given above, and the detailed description of the embodiment(s) given below, serve to explain the principles of the present disclosure.

FIG. 5A is a screen illustrating the contractors on site reporting function;

FIG. 5B is a screen illustrating the contractor status reporting function;

FIG. 5C is a screen illustrating the site statistics reporting function;

FIG. 6A is a screen illustrating how a beacon of a site is registered in the central system;

FIG. 6B is a screen illustrating how a registered mobile device is managed in the central system;

FIG. 7A is a diagram illustrating a QR reader authentication process at a barrierless entryway;

FIG. 7B is a screen illustrating generating of a QR code; and

DETAILED DESCRIPTION

Figure 1:
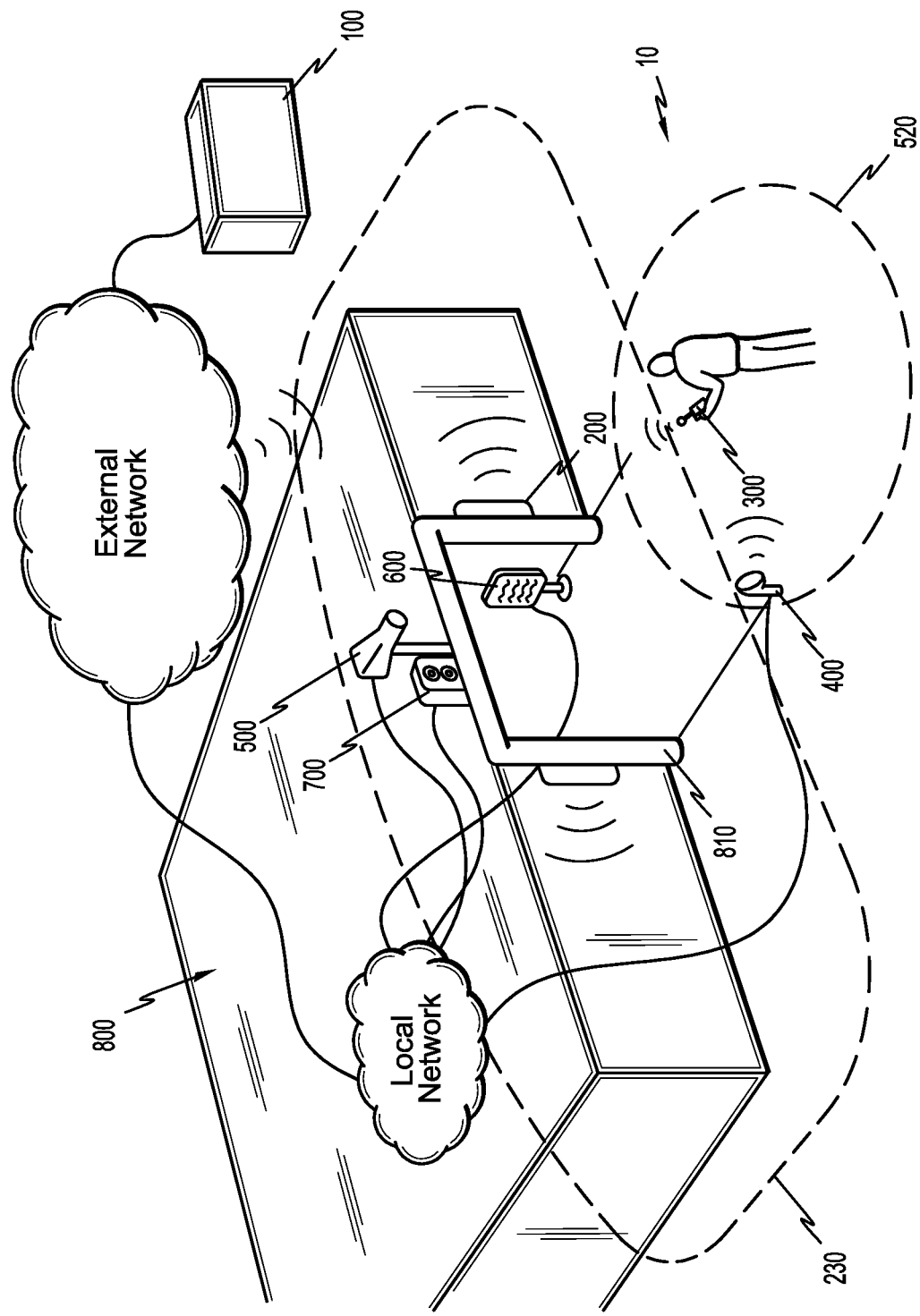
FIG. 1 is a diagram of an exemplary system for restricted site access management.

The present disclosure relates to systems and methods for managing access to a restricted site through a barrierless entryway, in a manner the permits the detection of unauthorized entry into the restricted site. Aspects and embodiments are described in detail with reference to the drawings, in which like or corresponding reference numerals designate identical or corresponding elements in each of the several views.

A central system as described herein may utilize one or more computer servers to receive various information and transform the received information to generate an output. The central system may include any type of computing device, computational circuit, or any type of processor or processing circuit capable of executing a series of instructions that are stored in memory. The central system may include multiple processors and/or multicore central processing units (CPUs) and may include any type of processor, such as a microprocessor, digital signal processor, microcontroller, programmable logic device (PLD), field programmable gate array (FPGA), or the like. The central system may also include a memory to store data and/or instructions that, when executed by the one or more processors, cause the one or more processors to perform one or more methods and/or algorithms.

FIG. 1 is a diagram of an exemplary system 10 for restricted site access management. The illustrated system includes a central system 100 of networked computer resources configured to receive and store data received from any registered device 300 passing through a barrierless entryway 810 of a restricted site 800. The registered device 300 can be any network enabled mobile electronic device that has software from the central system 100 installed thereon. The central system 100 is also configured to store a registered location ID for the barrierless entryway 810 and a registered device ID for each registered device 300, which will be described in more detail in connection with FIGS. 2B and 2C. The central system 100 will use the stored registered location ID and the stored registered device ID in the authentication process, which will be discussed in more detail later herein.

In accordance with aspects of the present disclosure, when a person walks toward the barrierless entryway 810, a beacon 200 will broadcast a signal to the person within a broadcast zone 230. In embodiments, the broadcast zone 230 can reach a distance of 40 feet from the beacon 200. In embodiments, the broadcast zone 230 can reach a distance of more than 40 feet or less than 40 feet, such as 50 feet, 60 feet, or another distance. If the person is carrying any registered device 300, then the registered device 300 will detect the broadcast signal of the beacon 200 and transmit self-identifying information, via wireless network, to the central system 100 to authenticate the person. If the person is not carrying a registered device 300, then a sensor 400 will still be able to detect the person's movement towards the restricted site 800 and notify the central system 100, via local and external networks, of the person approaching the barrierless entryway 810. Once notified, the central system 100 will command a camera 500, via local and external networks, to capture an image of the approaching person and to send the image to be stored and processed by the central system 100. The camera 500 can, for example, cover a region of approach 520 to the barrierless entryway 810. The central system 100 will then communicate the captured image to the restricted site 800 and/or to another site, where an alarm or alert can be raised so that the approaching person can be recognized, identified, or flagged, and then manually authenticated and allowed to enter, denied entry and removed from the premises, or tracked down within the restricted site. In embodiments, the alarm or alert can be a visual alert implemented on a display screen 600 and/or an audio alert implemented by a speaker 700.

In the illustrated embodiment, the beacon 200 is positioned farther from the barrierless entry 810, and the sensor 400 is positioned closer to the barrierless entryway 810. In other embodiments, the beacon 200 can be positioned closer to the barrierless entryway 810 than the sensor 400. For example, in embodiments, the beacon 200 can be positioned at the barrierless entryway 810. The positions of devices illustrated in FIG. 1 is exemplary, and variations are contemplated to be within the scope of the present disclosure.

In embodiments, the local network can include any local area network, including Ethernet and/or Wi-Fi networks, intranets, among others, and can include various devices such as routers, access points, repeaters, and bridges, among others. In embodiments, the external network can include any network outside of a local network, such as a portion of an Internet service provider network, cloud service provider network, and/or part of a public Internet infrastructure network. In embodiments, the central system 100 can operate in the cloud.

In embodiments, the barrierless entryway 810 can be dimensioned to permit only one person to pass through the entryway 810 at a time. In embodiments, the barrierless entryway 810 can be dimensioned to permit multiple people to pass through the entryway 810 at a time. All such configurations are contemplated to be within the scope of the present disclosure.

Figure 2A:
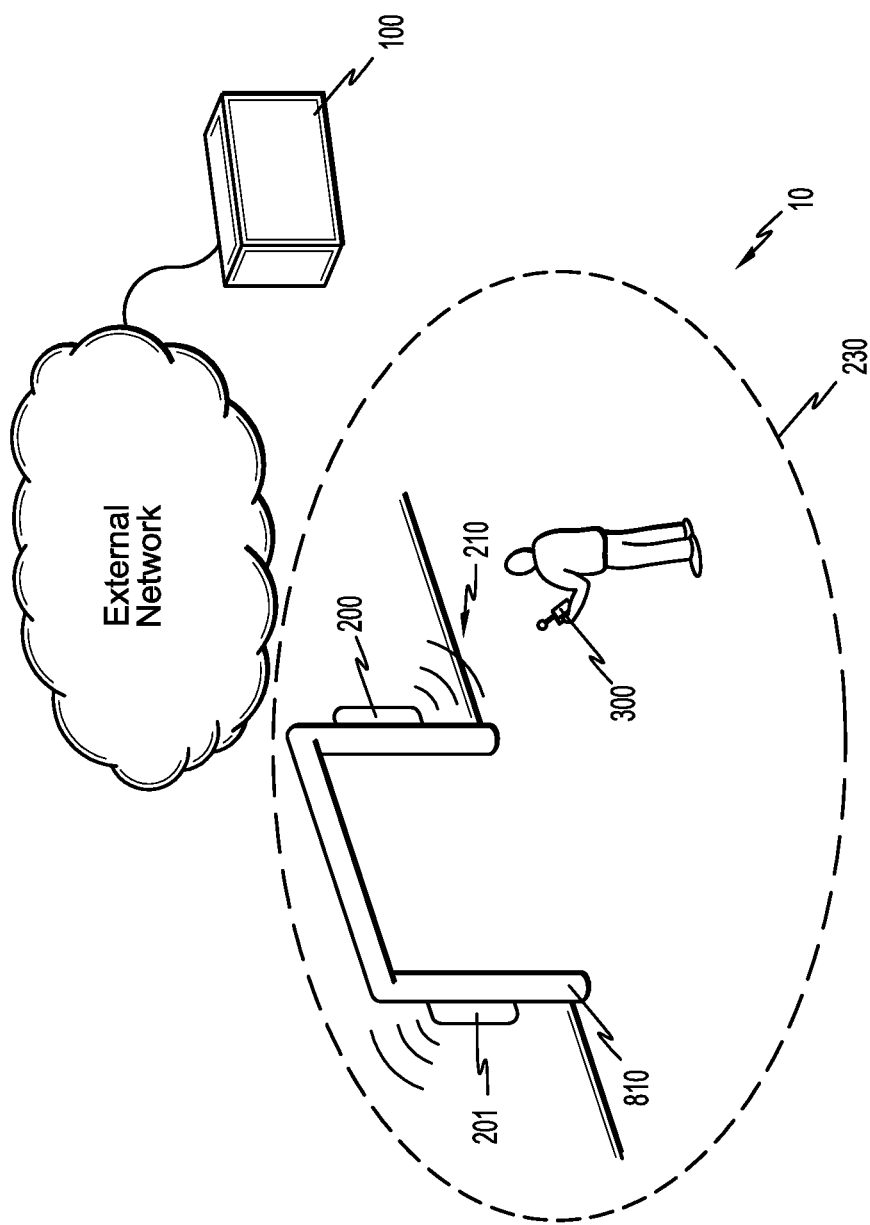
FIG. 2A is a diagram illustrating the physical device authentication process at a barrierless entryway.
Figure 2E:
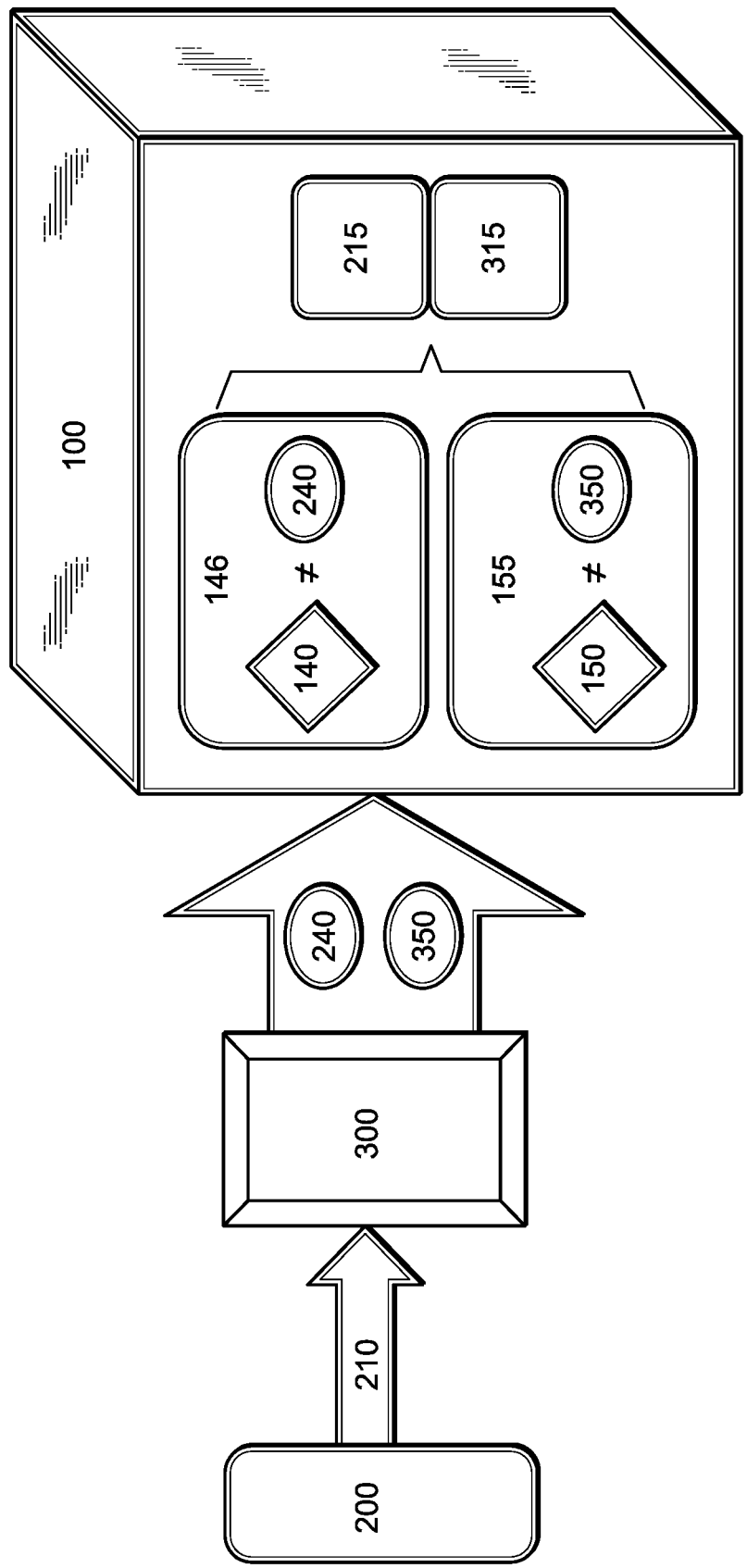
FIG. 2B is a flow chart of the device authentication process illustrated in FIG. 2A, resulting in an authentication record.
FIG. 2C is a flow chart of the device authentication process illustrated in FIG. 2A, resulting in a device error.

FIGS. 2A-2C provide more detail on the device authentication process at the barrierless entryway 810. The beacon 200 is configured to continuously broadcast a beacon signal 210 over a zone 230 that includes the barrierless entryway 810. The zone 230 represents the area within which the beacon signal 210 can be received and recognized, and accordingly the area within which any registered device 300 can receive and recognize the beacon signal 210. Hence, the zone 230 includes the barrierless entryway 810 to ensure that the beacon signal 210 is received by any registered device 300 entering the restricted site 800 through the barrierless entryway 810.

In FIG. 2A, two beacons 201 and 200 form a beacon pair, where beacon 201 broadcasts primarily inward within the restricted site 800 and beacon 200 broadcasts primarily outward outside the restricted site 800. Beacons 201 and 200 are installed inside and outside of the barrierless entryway, respectively, to ensure that the beacon signal 210 can be detected by any registered device 300 approaching the barrierless entryway irrespective of whether the person is attempting to enter or exit the restricted site 800. In embodiments, a signal obstruction can be placed in between the beacon pair to reduce signal interference, such as a wall or solid fence. In embodiments, such a signal obstruction may allow the beacon 200 to broadcast its signal mainly outside the restricted site 800 and allow the beacon 201 to broadcast its signal mainly within the restricted site 800. This configuration will allow the central system 100 to monitor activity all around a given barrierless entryway 810, which will increase the robustness of the central system 100's access management capability.

Additionally, in embodiments employing the beacon pair configuration, despite opposing orientations or a signal obstruction, there may be instances where the registered device 300 will receive a beacon signal 210 from both the inner beacon 201 and the outer beacon 200. Furthermore, the signal strength can vary at times resulting in the beacon signal 210 from the inner beacon 201 being stronger than the beacon signal 210 from the outer beacon 200, or vice versa. In embodiments, to address this potential interference, the software installed on the registered device 300 can be configured to collect and store data of signal strength over time, and then to calculate an average signal strength over time for each beacon 201 and 200. Whichever beacon 201 or 200 is determined to have the stronger average signal strength is selected. The beacon broadcast signal can include a beacon ID and/or location ID, and the registered device 300 will then transmit the beacon ID and/or location ID to allow the central system 100 to determine whether the person is entering or leaving the restricted site 800 and to identify the restricted site. In embodiments, the beacon ID is a unique identifier assigned to or otherwise associated with the beacon 200 at the time of manufacturing the beacon, such as a serial number. In embodiments, the beacon ID can be a unique identifier assigned to the beacon by the central system 100. In embodiments, the location ID is a unique identifier associated with the barrierless entryway 810 when the entryway 810 is registered with the central system 100. In embodiments, the location ID can be a geographical coordinate, such as a longitude and latitude coordinate. In embodiments, the location ID can be a beacon ID as described above herein. The possible values for beacon ID and location ID are exemplary, and other variations are contemplated to be within the scope of the present disclosure.

The beacon signal 210 is configured to prompt any registered device 300 receiving the beacon signal 210 to transmit an active device ID for the registered device 300 and a beacon ID and/or active location ID for the barrierless entryway 810 to the central system 100. The central system 100 is configured to receive and store the active device ID and the beacon ID and/or active location ID from the registered device 300, and then to cross-reference the beacon ID and/or active location ID against registered location IDs, and cross-reference the active device ID against registered device IDs.

FIG. 2B shows a flow chart of the device authentication process illustrated in FIG. 2A, resulting in a successful authentication of the registered device 300. As described above, a beacon 200 broadcasts a signal 210, which is received and recognized by a registered device 300. The beacon signal 210 can include an active beacon ID and/or an active location ID. The registered device 300 then transmits its active device ID 350 and the active location or beacon ID 240 to the central system 100. The central system includes registered location or beacon IDs 140 and registered device IDs 150. After cross-referencing, the central server finds a match 155 between the active device ID 350 and a registered device ID 150 and also finds a match 145 between the active location or beacon ID 240 and a registered location or beacon ID 140, and the central system 100 is configured to create and store an authentication record 110. In the illustrated embodiment, the authentication record 110 includes the active device ID 350, a device timestamp and/or date stamp 151, and the active location or beacon ID 240. The authentication record 110 provides a record of the person approaching the barrierless entryway 810, the time/date when the approach occurred, and the identifier of the barrierless entryway 810. FIG. 2B is exemplary and in embodiments, an authentication record 110 can include more information or different information than as shown in FIG. 2B. Uses of the authentication records 110 will be described in more detail later herein. As used herein, the term "timestamp" refers to information indicating a particular time, a particular date, or a particular time and date. In contrast, the term "date stamp" refers to a particular date.

In embodiments a registered device ID 152 may be flagged as inactive for a number of reasons. For example, a former employee, visitor, or contractor may have left the company and accordingly had his device flagged as inactive as part of his exit process, or a current employee, visitor, or contractor may need to have his access temporarily removed for disciplinary/security reasons. As illustrated in FIG. 2C, if after cross-referencing, the central server 100 finds a match 156 between the active device ID 350 and the registered device IDs 152, but the registered device ID 152 is flagged as inactive, then the central system 100 is configured to create and store an unauthorized entry record 315.

Figure 3A:
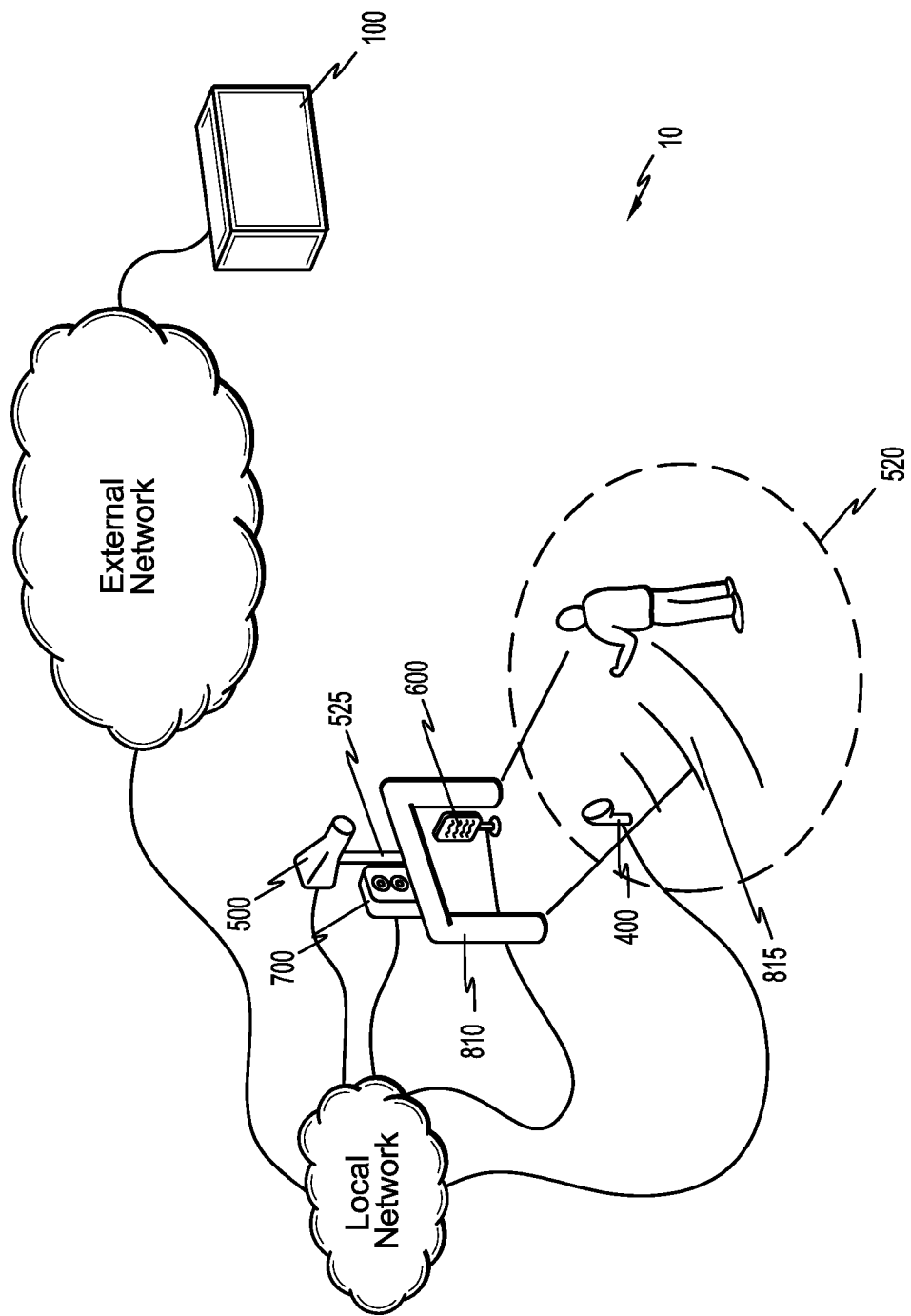
FIG. 3A is a diagram illustrating how the sensor, camera, and central system coordinate to capture an image of a person entering a restricted site through the barrierless entryway.
Figure 3B:
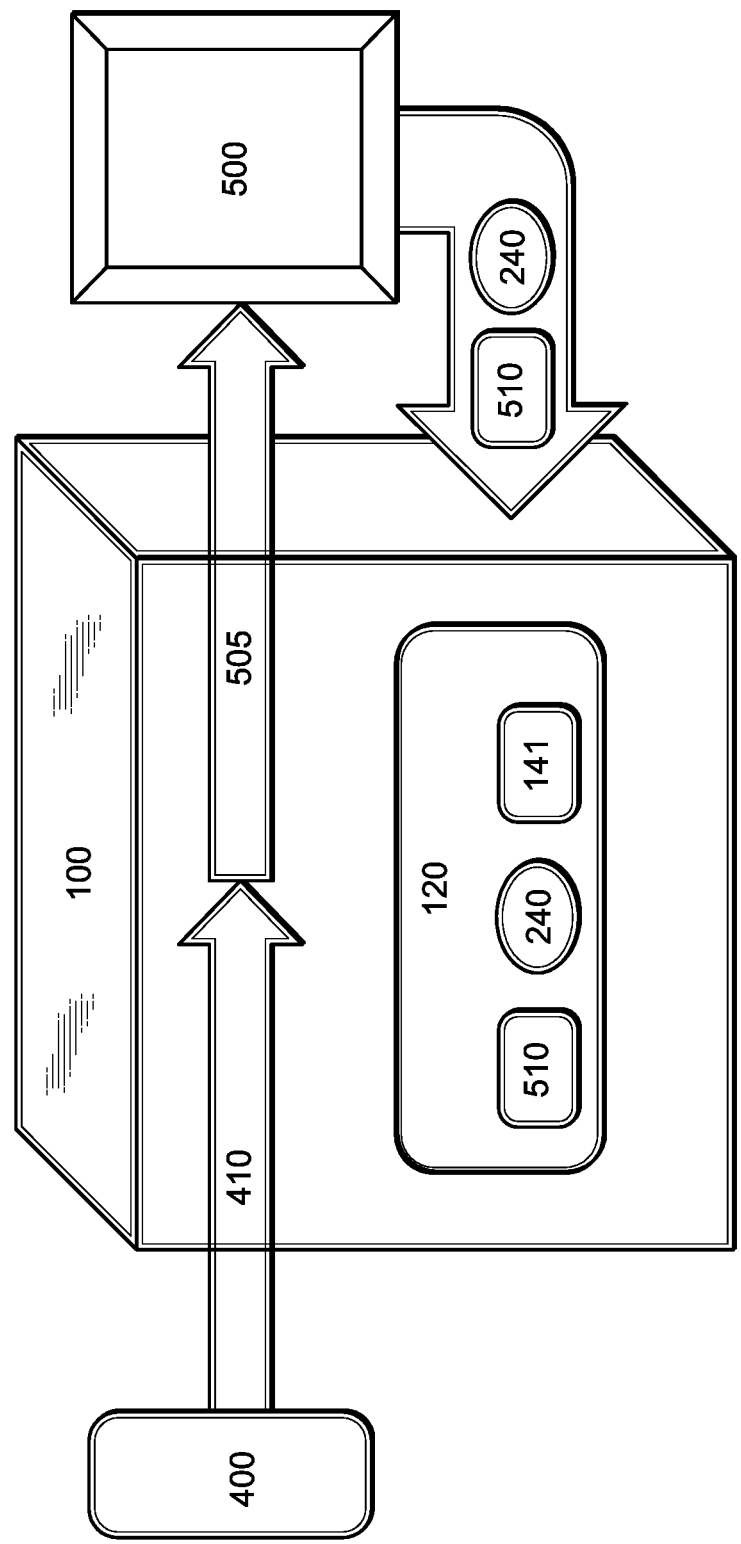
FIG. 3B is a flow chart of the image capture process illustrated in FIG. 3A.

Referring to both FIGS. 3A-3B, the diagrams provide more detail on how the sensor 400, the camera 500, and the central system 100 coordinate to capture an image of the person entering the restricted site 800 through the barrierless entryway 810. The sensor 400 is configured to detect movement towards the restricted site 800 on an approach 815 leading to the barrierless entryway 810, and to communicate a notification 410 to the central system 100 indicating that motion was detected. The sensor 400 can communicate the notification to the central system 100 using the local network of the restricted site and one or more external networks. In embodiments, the contents of the notification 410 shown in FIG. 3B can include an identifier for the sensor. The sensor identifier can be a unique identifier that is assigned to the sensor at the time of manufacturing, or can be an identifier that is assigned to the sensor by the central system 100. Other possible values can be used for the sensor identifier as well. In embodiments, the sensor 400 is an infrared sensor.

The central system 100 is configured to receive the notification 410 and to respond to the notification 410 by communicating a control signal 505 to the camera 500 to capture the image 510 of the approaching person. The camera 500 can be configured to capture an image of a region of an approach 520 to the barrierless entryway 810. After receiving control signal 505 from the central system 100, the camera 500 is configured to capture the image 510, and then to communicate the image 510 to the central system 100. After the image 510 is captured and transmitted to the central system 100, the central system 100 is configured to receive the image 510 from the camera 500, and to store the image 510. Then upon receiving the image 510 from the camera 500, the central system 100 is configured to create and store a visual record 120 that includes the image 510 and an image timestamp and/or date stamp 141. In embodiments, the image timestamp and/or date stamp 141 can be metadata stored in the image 510, and the central system 100 can extract the timestamp and/or date stamp 141 from the image 510. In embodiments, the image 510 can also include a camera identifier as metadata in the image 510. The camera identifier can be a unique identifier that is assigned to the camera at the time of manufacturing, or can be an identifier that is assigned by the central system 100 to the camera. In embodiments, the camera identifier and the image timestamp and/or date stamp 141 can be communicated separately from the image 510.

In FIG. 3A the sensor 400 is positioned ahead of the barrierless entryway 810 and oriented to detect movement on the approach 815 to the entryway 810, so that any detected motion is detected early enough for the notification 410 to be communicated to the central system 100, for the control signal 505 to be communicated to the camera 500, and for the active location ID 240 and the image 510 to be communicated back to the central system 100, before the approaching person can enter the restricted site 800 through the barrierless entryway 810.

High speed network connections can allow for these operations to seem instantaneous, even though the notification 410, the control signal 505, and the active location ID 240 and captured image 510 will each take some amount of time to be transmitted and received, and even in the event of high network latency. Therefore, the sensor 400 and the camera 500 are strategically positioned to provide the operations described above. Accordingly, the sensor 400 and the camera 500 should be installed in a position 525 such that the image 510 can be captured and communicated to the central system 100 before the person triggering the sensor 400 can pass through the barrierless entryway 810.

In addition to considering the effect of network latency, the camera 500 can be positioned so that the captured image 510 shows a region 520 encompassing the approach 815 to the barrierless entryway 810. Additionally, the image 510 can also include a facial region 515 of a person, which will be described in more detail in connection with FIG. 4D. Accordingly, the camera 500 of FIG. 3A can be positioned some distance away from the sensor 400 and mounted above the barrierless entryway 810 to capture such information.

Whenever a person carrying a registered device approaches a barrierless entryway 810, the beacon 200 and the sensor 400 each prompt separate processes to obtain identifying information about the approaching person. The authentication record 110 and unauthorized entry record 350 are derived from the interaction between the beacon 200, the registered device 300, and the central system 100, as described in connection with FIGS. 2A-2C, while the visual record 120 is derived from the interaction between the sensor 400, the camera 500 and the central system 100, as described in connection with FIGS. 3A and 3B. In embodiments, each authentication record 110 and unauthorized entry record 315 has a corresponding visual record 120, and the two records 110 and 120 should be created at approximately the same time frame, such as within about 3 seconds from each other, or within another time duration from each other.

Figure 4A:
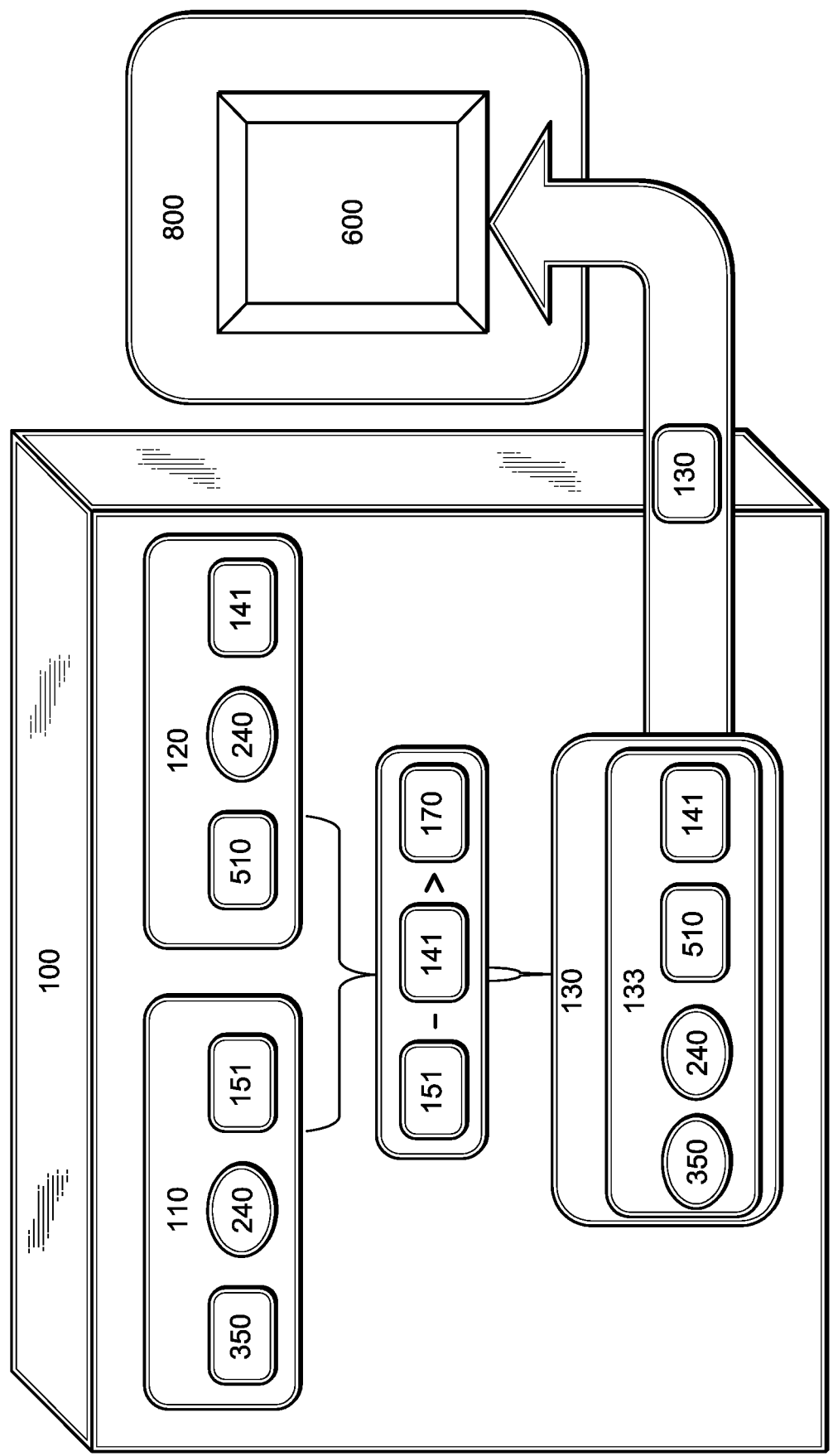
FIG. 4A is a flow chart of the event log population process resulting in an event entry.

FIG. 4A is a flow chart depicting how the central system 100 combines the authentication record 110 and the visual record 120 to populate an event log 130 with an event entry 133. For convenience, FIG. 4A will refer to just an authentication record 110, but FIG. 4A applies to an unauthorized entry record 315 as well.

As described above, an authentication record 110 includes the active device ID 350, a device timestamp and/or date stamp 151, and the active location or beacon ID 240. A visual record 120 includes an image 510 and an image timestamp and/or date stamp 141. An event entry 133 involving a registered device 300 can be represented by a pairing of the authentication record 110 and the visual record 120. In embodiments, the pairings are created based on the relative temporal proximity of the authentication record 110 and the visual record 120, which is based on the image timestamp and/or date stamp 141 of the visual record 120 and the device timestamp and/or date stamp 151 of the authentication record 110. For example, the central system 100 can be configured to populate the event log 130 with an event entry 133 for every instance where the separation in time between the image timestamp and/or date stamp 141 and the closest, earlier device timestamp and/or date stamp 151 is below a threshold value 170. The threshold value 170 can be set, for example, based on empirical testing of entry events and/or based on statistical analysis of entry events. Increasing the threshold value 170 by too large an amount can reduce the accuracy of the event entry 133. In embodiments, the threshold value 170 can be set to 3 seconds or less. Each event entry 133 of the event log 130 can include the active location ID 240, the active device ID 350, the image 510, and the image timestamp and/or date stamp 141. In embodiments, an event entry 133 can include additional or different information than as illustrated in FIG. 4A, such as the device timestamp and/or date stamp 151, or can include less information than as illustrated in FIG. 4A. For example, in embodiments, an event entry 133 can include just the information in an authentication record 110 without any image information. Other variations are contemplated to be within the scope of the present disclosure. The central system 100 can communicate the event log 130 to the restricted site 800, such as to a visual display 600 at the restricted site 800. In embodiments, the central system 100 can communicate each event entry 133 as they are generated or can communicate bursts of multiple event entries 133.

As mentioned above, in embodiments of the entryway 810, the entryway can be dimensioned to permit multiple people to pass through the entryway at a time. In such situations, a visual record 120 may include multiple people in the image 510. In accordance with aspects of the present disclosure, the operation of FIG. 4A can associate multiple authentication records 110 corresponding to multiple registered devices with a single visual record 120. For example, a visual record 120 may be associated with any earlier authentication record 110 for which the time difference between the time/date stamps 151 and 141 is less than or equal to the threshold 170. In embodiments, a single visual record 120 can be replicated, and each duplicate visual record can be associated with a single authentication record 110. Accordingly, each such authentication record 110 can be associated with a visual record 120 and can correspond to an event entry 133.

As mentioned above, the aspects described in connection with FIG. 4A can apply to an unauthorized entry record 315 in the same way that FIG. 4A applies to an authentication record 110. Accordingly, an unauthorized entry record 315 can be paired with a visual record 120 to generate an event entry 133. Such an event entry 133 of the event log 130 can include the active location ID 240, the active device ID 350, the image 510, and the image timestamp and/or date stamp 141, as shown in FIG. 4A. Additionally, an event entry 133 based on an unauthorized entry record 315 can include an indication that the entry was unauthorized.

Figure 4B:
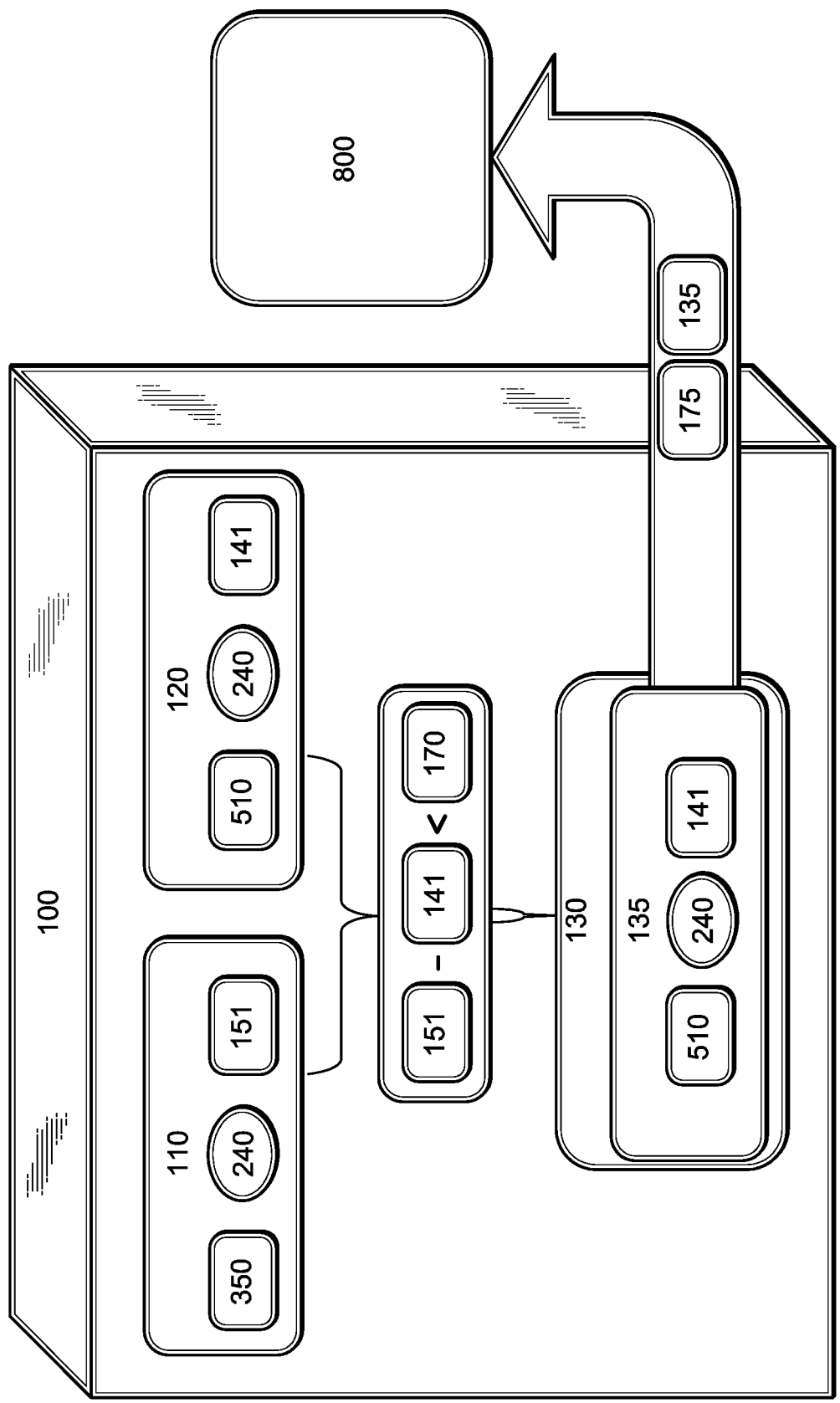
FIG. 4B is a flow chart of the event log population process resulting in a risk entry.

FIG. 4B is a flow chart depicting how the central system 100 compares authentication records 110 and unauthorized entry records 315 with a visual record 120 to populate an event log 130 where there is a risk entry. In the illustrated embodiment, the central system 100 is configured to populate the event log 130 with a risk entry 135 for instances where the separation in time between the image timestamp and/or date stamp 141 and the closest, earlier device timestamp and/or date stamp 151 of any authentication record 110 or unauthorized entry record 315 is beyond a threshold value 170. A risk entry 135 of the event log 130 can include the visual record 120 without any accompanying authentication record 110 or unauthorized entry record 315, and therefore only includes the image 510 and the image timestamp and/or date stamp 141. In accordance with aspects of the present disclosure, when a risk entry 135 is created, the risk entry 135 can be communicated to the restricted site 800 along with an alert 175, which will be described in more detail below.

Figure 4C:
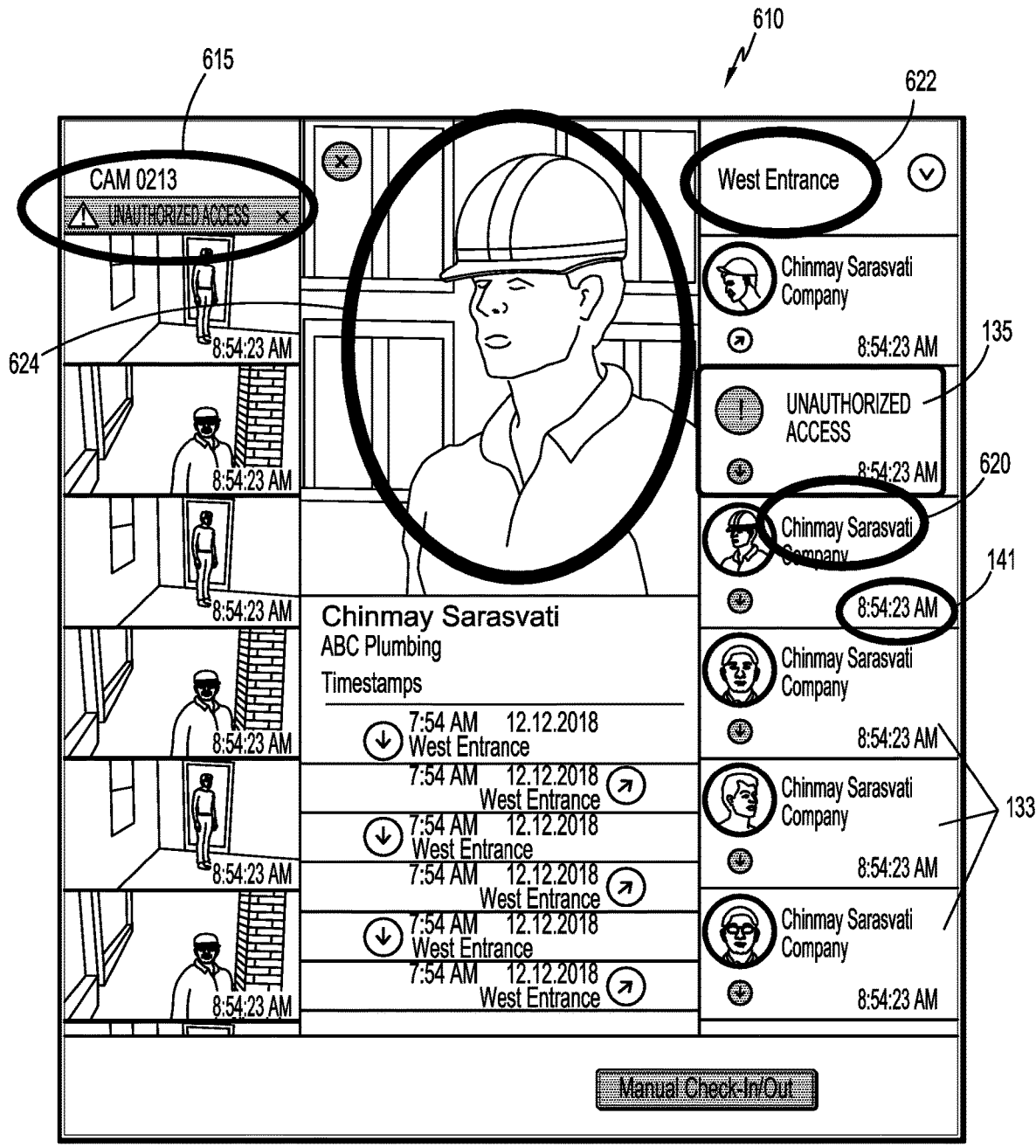
FIG. 4C is a screen illustrating the real-time logging function.

Referring to FIG. 4C, the access management system 10 includes a display screen 600 at the restricted site 800 configured to provide a real-time display 610 of the event log 130 being populated by the central system 100. FIG. 4C exemplifies an illustrative screen 610 showing a real-time event log 130. The event log 130 at the right side of the screen 610 is populated with a combination of event entries 133 and risk entries 135. An event entry 133 of the screen 610 shows the registered name 620 associated with the active device ID 350 of the entry event 133. Instead of displaying the actual numerical representation of the active device ID 350, the central system 100 has associated the active device ID 350 with a user profile populated with information about the registered user such as name 620, position, and/or level of security clearance, among other things. Similarly, instead of displaying the numerical representation of the active location ID 240, the display screen 610 provides a descriptive name 622 for location of the entry events. Furthermore, the center of the screen 610 includes expanded information for a selected event entry 133. The expanded information can include and displays a recent history of timestamps and/or date stamps for a particular person and a profile image 624 for the person that is registered with the central system 100. By using profile pictures 624 and profile names 620 associated with an entry event 133, the information is presented in a form that can be more easily recognized and used by people at the restricted site.

Figure 4D:
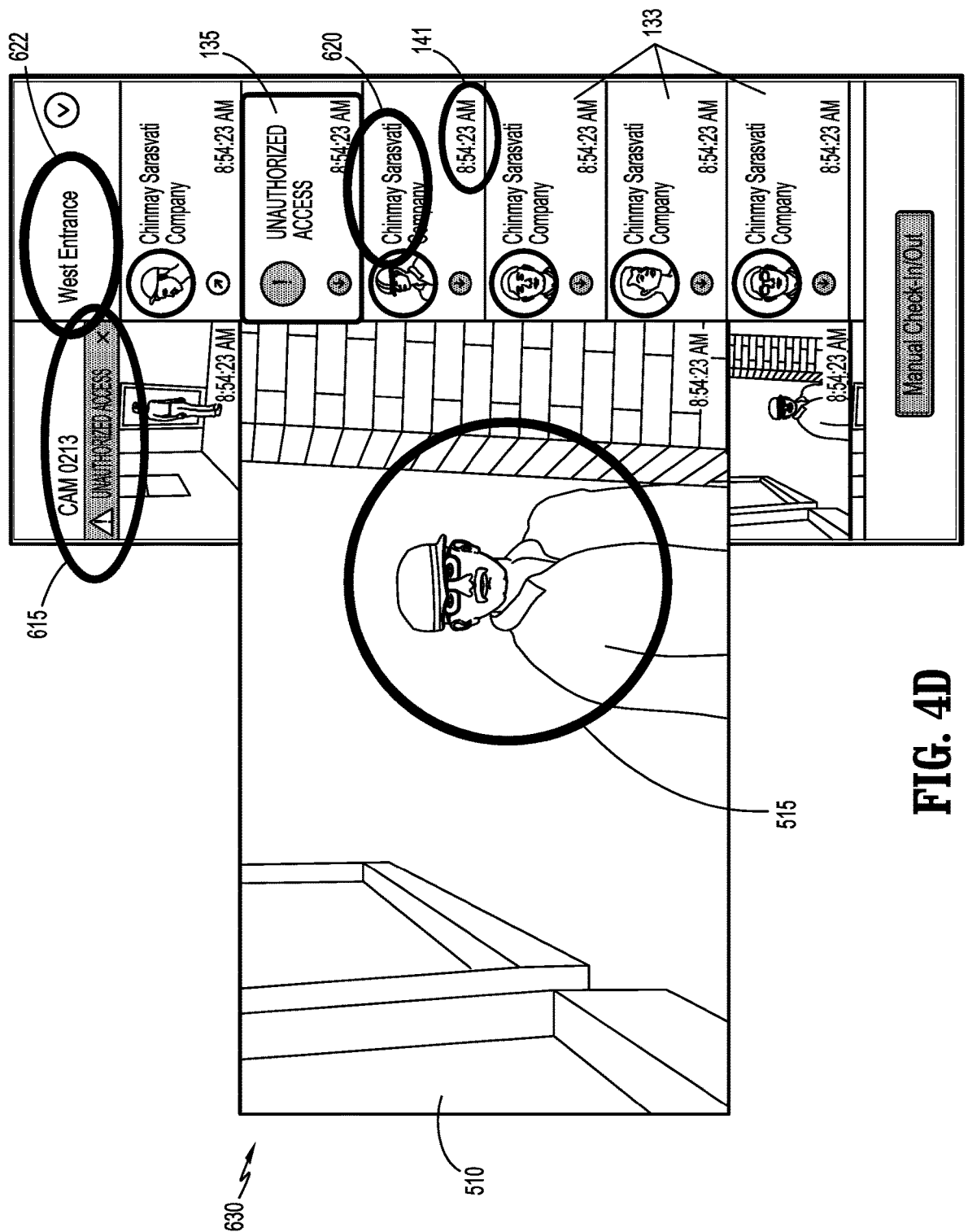
FIG. 4D is a screen illustrating the site alert notification function.

With reference to FIG. 4D, each risk entry 135 can prompt the central system 100 to communicate an alert 175 to the restricted site 800 (see FIG. 4B). For convenience, FIG. 4D will be described in relation to a risk entry 135. FIG. 4D can apply to an event entry 133 that is based on an unauthorized entry record 315, as well.

FIG. 4D is a screen 630 illustrating the site alert notification functionality. The selected risk entry 135 includes the captured image 510, the image timestamp and/or date stamp 141, and a location name 622 of the active location ID 240 of the risk entry 135. Additionally, the display screen 630 is configured to raise a visible alert 615 in response to the alert 175 received from the central system 100. In FIG. 4D the visible alert 615 can be located at the top of the screen as a caution icon in bright red. In embodiments, an audio alert may be implemented using a speaker 700 (see FIGS. 1 & 3A) at the restricted site in response to the alert 175 received from the central system 100. Once an alert is provided to security personnel at a restricted site, the personnel can determine a course of action.

Accordingly, described herein are systems and methods for managing access to a restricted site having a barrierless entryway, which operate in a manner that detects unauthorized entry. Authorized persons passing through the barrierless entry can authenticate themselves using a registered device. Possibly unauthorized persons are identified by a visual record and are presented to security personnel at the restricted site by an alert. The following will describe certain functionality for generating reports of information contained at the central system or for registering devices and beacons with the central system.

FIG. 5A-5C exemplify screens illustrating a variety of reports that the central system 100 is capable of generating. The central system 100 is configured to generate a plurality of reports 180 based on the image 510, the active location ID 240, and the image timestamp and/or date stamp 141 from the camera 500, and the active device ID 350, and the device timestamp and/or date stamp 151 from the registered device 300. In embodiments, where unique machine readable identifiers like the active device ID 350 and active location ID 240 are affiliated with user profiles and have been replaced with human readable representations the reporting function can further include information like: the name of the company, the first and last name of the owner of the registered device 300, the total time spent on site, the person's recent history of manual authentication, the total number of authenticated persons on site, and many more.

FIG. 5A shows a report of arrival and departure times for individual contractors, and also includes the total amount of time that the individual contractors were at the restricted site. The central system can determine this information from the time/date stamps associated with authentication events. The arrival times can be determined based on authentication events associated with outward facing beacons, and the departure times can be determined based on authentication events associated with inward facing beacons.

FIG. 5B shows a report of allowed and denied access to a restricted site, including the type of access. In FIG. 5B, an "Access Allowed" entry can correspond to an entry event based on an authentication record. A "Manual Check-in" entry or a "Access Denied" entry can correspond to an event entry based on an unauthorized entry record or to a risk entry, where an unauthorized person was manually checked-in by security personnel or were denied access by security personnel, respectively.

FIG. 5C shows a report on statistics of various companies having personnel at the restricted site. The report can be generated based on the information described above as being stored at the central system. The report indicates for individual companies the number of personnel the company has registered to be at the restricted site and the number of hours those personnel have been at the restricted site.

The reports of FIGS. 5A-5C are exemplary and variations are contemplated to be within the scope of the present disclosure.

FIG. 6A is a screen of registering a site with the central system. In the illustrated registration page, the beacon ID of a beacon located at an entryway can be entered into the illustrated registration page to associate the beacon with the entryway. Identifiers for a sensor and a camera, described above herein, can also be entered in the registration page. In embodiments, the registration process causes the associated beacons, sensor, and camera to be activated once the registration process is completed. In embodiments, the beacons, sensors, and cameras described herein are not operative until the registration process and activation are completed. The use of the beacon ID is described above in connection with FIGS. 2A-2C.

Figure 6B:
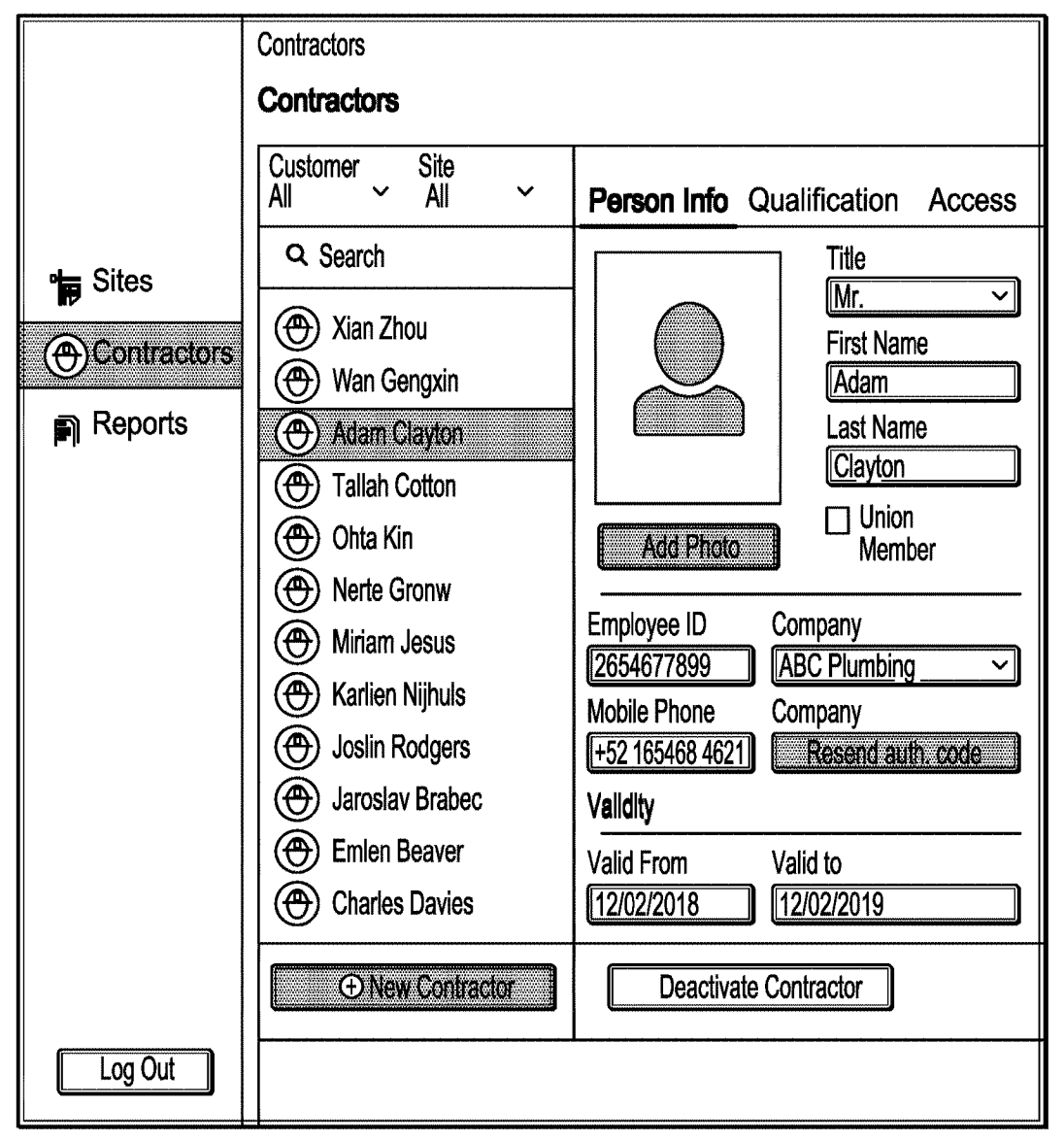

FIG. 6B is a screen of managing a registered mobile device at the central system. As described above, a registered device can be any network enabled mobile electronic device that has software from the central system installed thereon. The software installed on the mobile device can be a mobile app. During the registration of the software on the mobile device, the software may prompt the user to enter identifying information, as described above, including identifying information shown in FIG. 6B. The management screen of FIG. 6B can allow security personnel or other personnel to resend an authorization code to the registered device and to manage access privileges, among other things.

As mentioned above, each point of entry represents a unique physical location of the restricted site, and the access management system 10 can be used to manage restricted sites with multiple points of entry or even multiple restricted sites, where each restricted site contains multiple points of entry. In various situations, implementation of a barrierless entryway 810 for every point of entry at a given restricted site may not be required. In such cases, the access management system 10 allows for entryways with barriers 910 (e.g., turnstile, gate, etc.) to be installed at a site while one or more barrierless entryways 810 are also installed at the site to track persons entering and exiting the restricted site, as described below in connection with FIG. 7A.

Figure 7B:
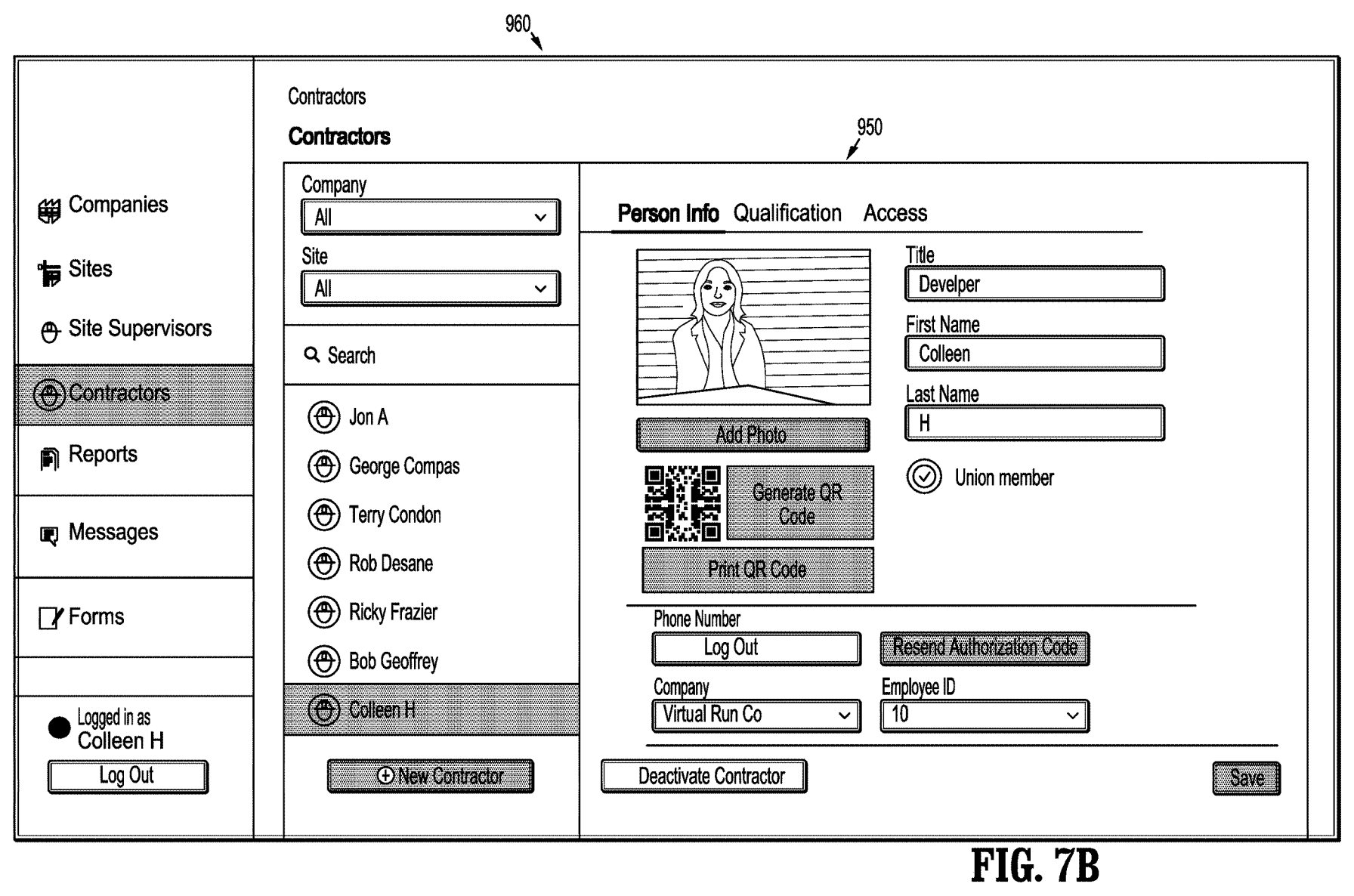

FIG. 7A illustrates an entryway 910 that uses a turnstile 920, a QR scanner 930, and a QR code 940 to authenticate employees/contractors attempting to access or depart from the restricted site. When entering or exiting through such an entryway 910, an employee/contractor will need to present their QR code 940 to be read by the QR scanner 930. Each QR code 940 is tied to a user profile 950 and is encoded with information about the registered user, such as name, position, level of security clearance, etc., as can be seen in FIG. 7B. Once a QR code 940 is read by QR scanner 930, the QR scanner 930 is configured to transmit the QR code 940 via a network connection to central system 100 where the scanned QR code 940 is cross-referenced with a pre-existing database of registered user profiles 950 to verify the identity of the employee/contractor. If the scanned QR code 940 is verified, then an entry record or a departure record is created and stored on central system 100, and the authenticated employee/contractor is permitted to pass through the turnstile 920. In embodiments, the turnstile 920 is controlled by an electronic lock, such that once the employee/contractor is authenticated, the central system 100 will automatically transmit an unlock signal back to the turnstile 920 to permit passage of the authenticated user. Additionally, in embodiments, instead of a turnstile 920, the entryway 910 may employ other mechanisms of restricting passage such as gates, standard doors, bollards, or levered arms, among other mechanisms.

The access management system 10 can facilitate any combination of barrierless entryways 810 and entryways with barriers 910 on a given restricted site, including: entirely barrierless entryways 810, entirely entryways with barriers 910, or a combination of both. In embodiments, each entry point can be configured either as a barrierless entryway 810 or as an entryway with a barrier 910 but not both. In embodiments, an entry point can be configured with both a barrierless entryway 810 and an entryway with a barrier 910. In such embodiments, a valid QR code used at the entryway with the barrier 910 can operate to overrule the operations described above herein for the barrierless entryway 810. Information collected by both the barrierless entryway 810 and by the entryway with the barrier 910 can be communicated to and stored/used the access management system 10.

Figure 7C:
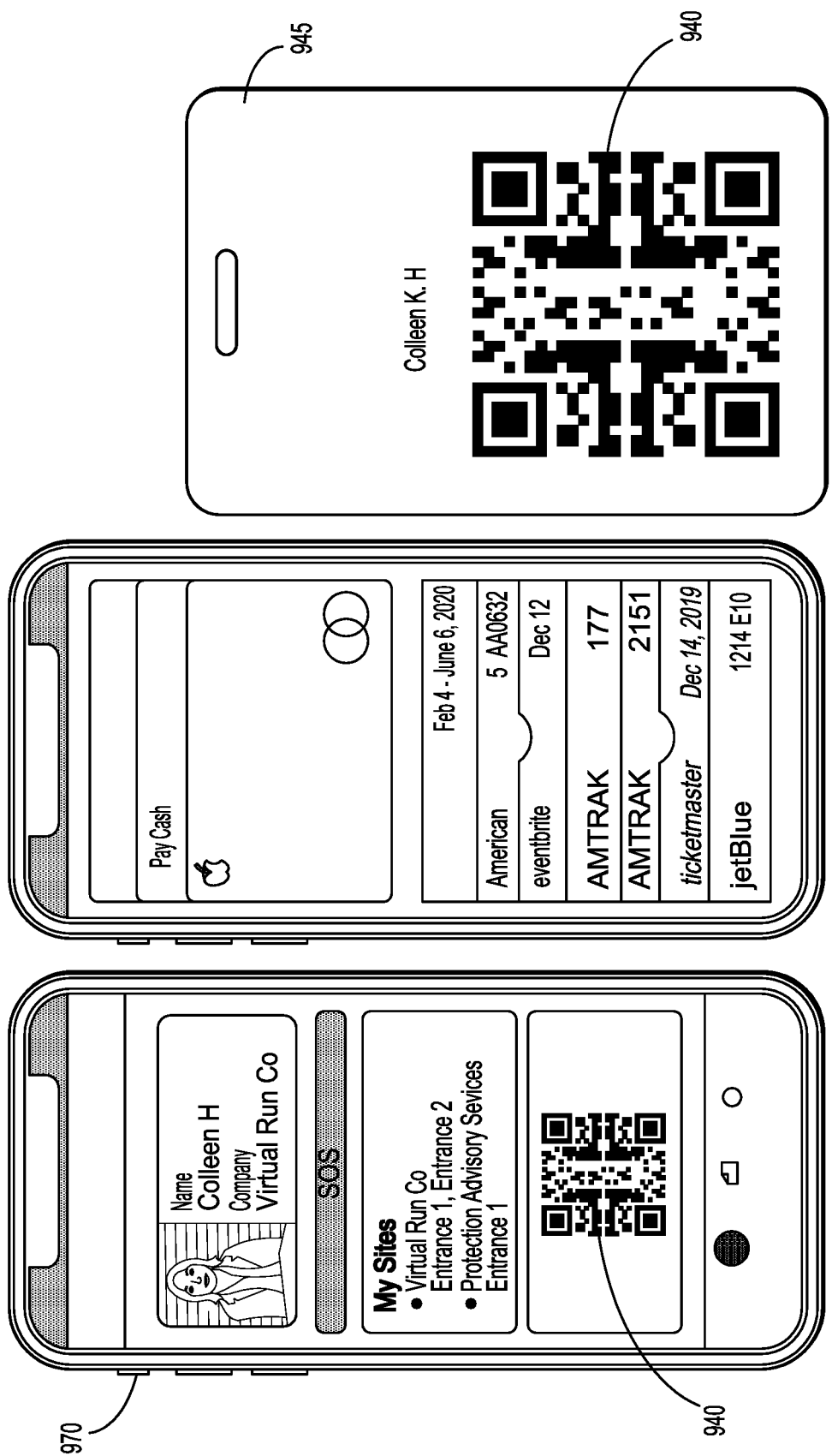
FIG. 7C is a mobile device screen illustrating display of a personal QR code.

Referring now to FIGS. 7B and 7C, the QR codes 940 employed in entryways having a barrier 910 are generated on an administrative interface 960 of software from the central system 100. The interface 960, as shown in FIG. 7B, allows administrators to create a new user profile 950, as well as to populate or modify the data fields within existing user profiles 950. Additionally, the interface 960 provides administrators with the option to generate and/or print new QR codes 940 for each user profile 950 stored on central system 100. In embodiments, registered users, i.e., employees/contractors whose user profiles 950 have already been created, have the option of using either a printed QR code 940 in the form of an ID badge 945 provided by the system administrators, or they can install software from the central system 100 on their personal electronic devices 970 and display the generated QR code 940 on the screen 975 of their personal electronic device 970.

Any of the herein described methods, programs, algorithms or codes may be converted to, or expressed in, a programming language or computer program. The terms "programming language" and "computer program," as used herein, each include any language used to specify instructions to a computer, and include (but are not limited to) the following languages and their derivatives: Assembler, Basic, Batch files, BCPL, C, C+, C++, Delphi, Fortran, Java, JavaScript, .NET, SQL DB, machine code, operating system command languages, mobile APIs and frameworks for iOS and Android, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Persons skilled in the art will understand that the structures and methods specifically described herein and shown in the accompanying figures are non-limiting exemplary embodiments, and that the description, disclosure, and figures should be construed merely as exemplary of particular embodiments. It is to be understood, therefore, that this disclosure is not limited to the precise embodiments described, and that various other changes and modifications may be effected by one skilled in the art without departing from the scope or spirit of this disclosure. Additionally, the elements and features shown or described in connection with certain embodiments may be combined with the elements and features of certain other embodiments without departing from the scope of this disclosure, and that such modifications and variations are also included within the scope of this disclosure. Accordingly, the subject matter of this disclosure is not limited by what has been particularly shown and described.

What is claimed is:
1. An access management system comprising:
a central system configured to receive and store data from a registered device passing through a barrierless entryway of a restricted site;
a beacon configured to broadcast a beacon signal over a zone that includes the barrierless entryway, wherein the beacon signal is configured to prompt the registered device receiving the beacon signal to transmit an active device ID for the registered device and an active location ID for the barrierless entryway to the central system;

a sensor configured to detect movement towards the restricted site on an approach to the barrierless entryway and to communicate a notification to the central system indicating the detected movement; and a camera configured to capture an image of a region encompassing the approach to the barrierless entryway, and to communicate the image to the central system, wherein the central system is configured to:

store a registered location ID for the barrierless entryway and registered device IDs for a plurality of registered devices, receive the notification and, in response to the notification, communicate a control signal to the camera to capture the image, receive the image from the camera, and store the image, store the active device ID and the active location ID, cross-reference the active location ID with the registered location ID, and cross-reference the active device ID with the registered device IDS, upon finding a first match between the active device ID and the registered device IDs, and finding a second match between the active location ID and the registered location ID, create and store one of: an authentication record including: the active device ID, the active location ID, and a device time/date stamp, or an unauthorized entry record including: an active location ID and a device time and/or date stamp, create and store a visual record including: the image and an image time/date stamp, and populate an event log with an event entry when a separation in time between the image time/date stamp and a closest earlier device time/date stamp is below a threshold value, wherein the event entry includes the active location ID, the active device ID, the image, and the image time/date stamp.

2. The access management system according to claim 1, wherein the central system is further configured to populate the event log with a risk entry when a separation in time between the image time/date stamp and a closest earlier device time/date stamp is beyond a threshold value, wherein the risk entry includes the visual record with no accompanying authentication record or unauthorized entry record, and wherein the risk entry prompts the central system to communicate at least one of an audible alert or visual alert to the restricted site.

3. The access management system according to claim 2, further comprising:

a display screen at the restricted site configured to provide a display of the event log in real time as the event log is populated by the central system.

4. The access management system according to claim 2, further comprising:

a display screen at the restricted site configured to raise at least one of an audible alarm or a visible alarm in response to the alert received from the central system; and a speaker at the restricted site configured to raise an audible alarm in response to the alert received from the central system.

5. The access management system according to claim 1, wherein the central system is configured to generate a plurality of reports based on at least one of: the image, the active location ID, the image time/date stamp from the camera, and the active device ID, the active location ID, or the device time/date stamp from the registered device.

6. The access management system according to claim 1, wherein the camera is installed in a position such that the image can be captured before a person triggering the sensor passes through the barrierless entryway.

7. The access management system according to claim 1, wherein the image includes a facial region of a person.

8. The access management system according to claim 1, wherein the sensor is an infrared sensor.

9. A method for managing site access comprising:

broadcasting, by a beacon, a beacon signal over a zone that includes a barrierless entryway of a restricted site, wherein the beacon signal is configured to prompt a registered device receiving the beacon signal to transmit an active device ID for the registered device and an active location ID for the barrierless entryway;

receiving, at a central system, the active device ID and the active location ID from the registered device passing through the barrierless entryway of the restricted site;

detecting, by a sensor, movement towards the restricted site on an approach to the barrierless entryway and notifying the central system of the detected movement;

receiving, at the central system, the notification and, in response to the notification, communicating a control signal to a camera at the restricted site to capture an image;

capturing, by the camera, the image of a region encompassing the approach to the barrierless entryway, and communicating the image to the central system;

storing, by the central system, a registered location ID for the barrierless entryway and registered device IDs for a plurality of registered devices;

receiving, by the central system, the image from the camera, and storing the image;

storing, by the central system, the active device ID and the active location ID;

cross-referencing, by the central system, the active location ID with the registered location ID;

cross-referencing, by the central system, the active device ID with the registered device IDs;

creating and storing an authentication record or an unauthorized entry record, upon finding a first match between the active device ID and the registered device ID and finding a second match between the active location ID and the registered location ID, wherein the authentication record includes: the active device ID, the active location ID, and a device time/date stamp, and wherein the unauthorized entry record includes: the active location ID and a device time/date stamp;

creating and storing a visual record including: the image and an image time/date stamp; and populating an event log with an event entry when a separation in time between the image time/date stamp and a closest earlier device time/date stamp is below a threshold value, wherein the event entry includes the active location ID, the active device ID, the image, and the image time/date stamp.

10. The method according to claim 9, further comprising:

populating the event log with a risk entry when a separation in time between the image time/date stamp and a closest earlier device time/date stamp is beyond the threshold value, wherein the risk entry includes the visual record with no accompanying authentication record or unauthorized entry record; and in response to the risk entry, communicating an alert to the restricted site.

11. The method according to claim 10, further comprising:
   displaying, at the restricted site, a display of the event log in real time as the event log is populated by the central system.

12. The method according to claim 10, further comprising:
   raising a visible alarm at the restricted site in response to the alert received from the central system; and
   raising an audible alarm at the restricted site in response to the alert received from the central system.

13. The method according to claim 9, further comprising:
   generating a plurality of reports based on at least one of the image, the active location ID, the image time/date stamp from the camera, the active device ID, the active location ID, or the device time/date stamp from the registered device.

14. The method according to claim 9, wherein the camera is installed in a position such that the image can be captured before a person triggering the sensor passes through the barrierless entryway.

15. The method for managing site access according to claim 9, wherein the image includes a facial region of a person.

\* \* \* \* \*